(12) United States Patent
Shimoshikiryoh

(10) Patent No.: US 8,207,926 B2
(45) Date of Patent: Jun. 26, 2012

(54) LIQUID CRYSTAL DISPLAY DEVICE

(75) Inventor: Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 469 days.

(21) Appl. No.: 12/312,377

(22) PCT Filed: Oct. 30, 2007

(86) PCT No.: PCT/JP2007/071145
§ 371 (c)(1),
(2), (4) Date: May 7, 2009

(87) PCT Pub. No.: WO2008/056574
PCT Pub. Date: May 15, 2008

(65) Prior Publication Data
US 2010/0053052 A1    Mar. 4, 2010

(30) Foreign Application Priority Data
Nov. 9, 2006    (JP) .................................. 2006-304537

(51) Int. Cl.
*G09G 3/36* (2006.01)

(52) U.S. Cl. .............................. 345/89; 345/94; 345/204

(58) Field of Classification Search ............ 345/87–102, 345/204, 208–210; 349/39
See application file for complete search history.

(56) References Cited

U.S. PATENT DOCUMENTS

| | | |
|---|---|---|
| 4,345,249 A | 8/1982 | Togashi |
| 6,724,452 B1 | 4/2004 | Takeda et al. |
| 6,958,791 B2 | 10/2005 | Shimoshikiryo |
| 7,782,346 B2 * | 8/2010 | Akiyama ...................... 345/694 |
| 7,791,577 B2 * | 9/2010 | Kitayama et al. ............... 345/94 |
| 7,948,463 B2 * | 5/2011 | Kitayama et al. ............... 345/96 |
| 2001/0006410 A1 | 7/2001 | Yamada et al. |
| 2001/0024257 A1 | 9/2001 | Kubo et al. |
| 2006/0097972 A1 * | 5/2006 | Takeuchi et al. ................ 345/90 |

FOREIGN PATENT DOCUMENTS

| | | |
|---|---|---|
| JP | 2006-119539 | 5/2006 |
| WO | WO 2006035887 A1 * | 4/2006 |
| WO | WO 2006098448 A1 * | 9/2006 |

* cited by examiner

*Primary Examiner* — Amare Mengistu
*Assistant Examiner* — Hong Zhou
(74) *Attorney, Agent, or Firm* — Harness, Dickey & Pierce, P.L.C.

(57) ABSTRACT

In one embodiment of the present invention, a liquid crystal display device is disclosed, each pixel includes first and second subpixels, each of which includes a storage capacitor. Storage capacitor counter voltages applied independently to the storage capacitor counter electrodes of the first and second subpixels are varied within each vertical scanning period of the input video signal. As a result, each vertical scanning period of the input video signal includes a first subframe in which the first and second subpixels have luminances Y_SP1_A and Y_SP2_A, respectively, and a second subframe SFB in which the first and second subpixels have luminances Y_SP1_B and Y_SP2_B, respectively, where Y_SP1_A≠Y_SP2_A, Y_SP1_B≠Y_SP2_B, and Y_SP1_A≠Y_SP1_B or Y_SP2_A≠Y_SP2_B are satisfied. As a result, the viewing angle dependence of the γ characteristic can be reduced with the decrease in the transmittance of the liquid crystal display device minimized.

6 Claims, 21 Drawing Sheets

FIG. 1
(a)
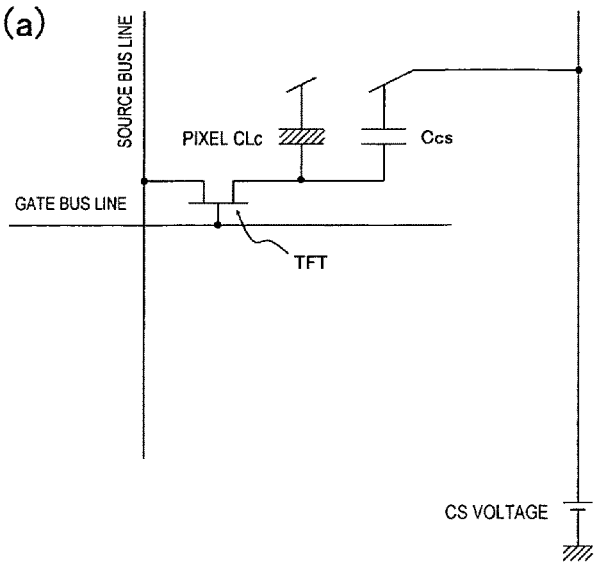
(b)
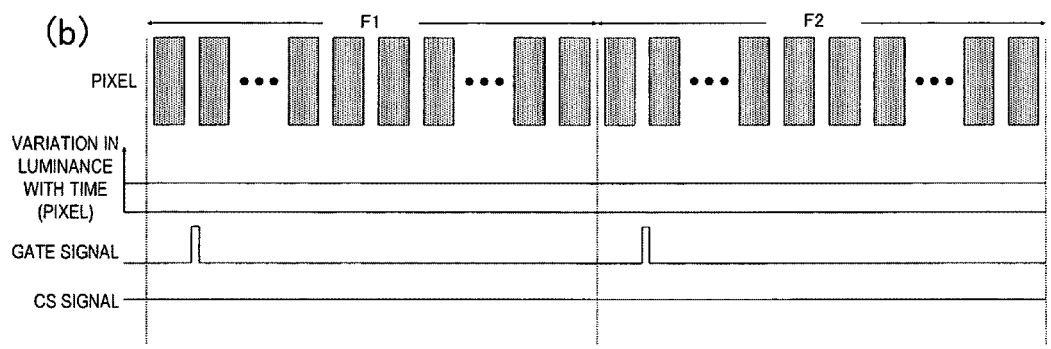

*FIG.2*
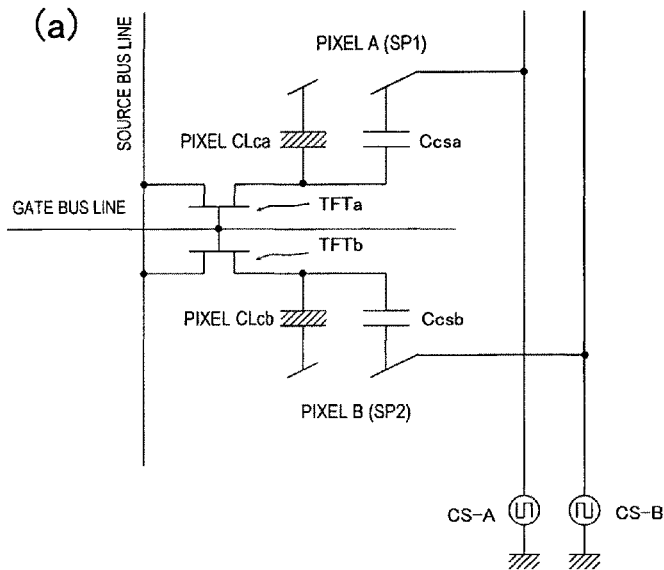
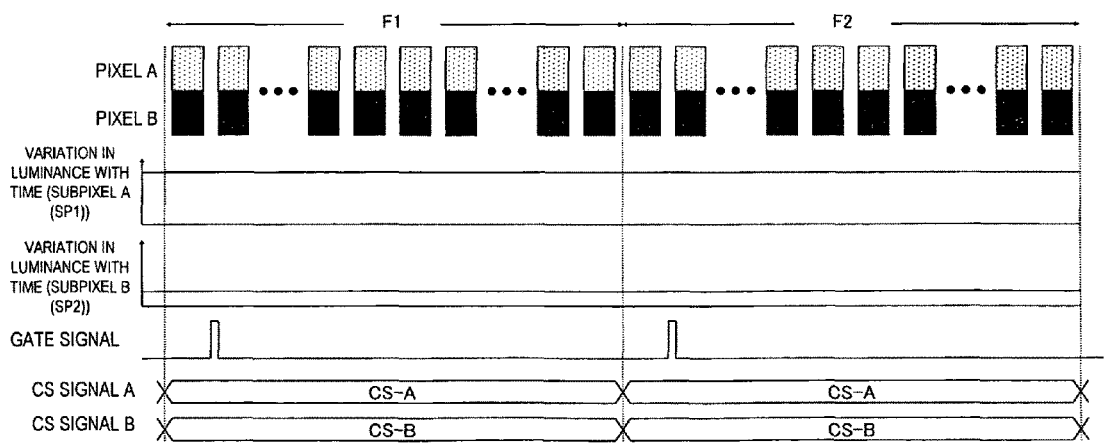

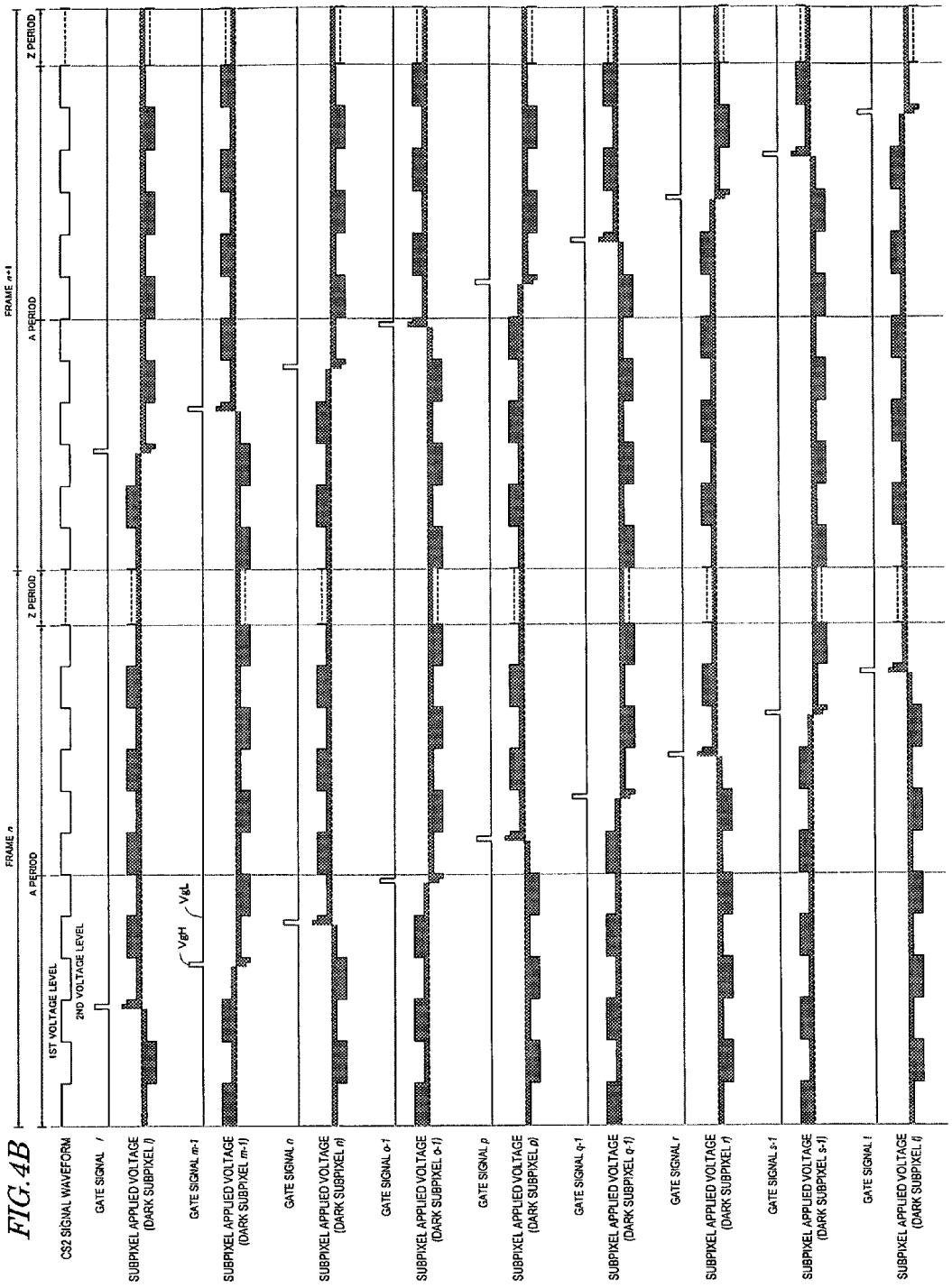

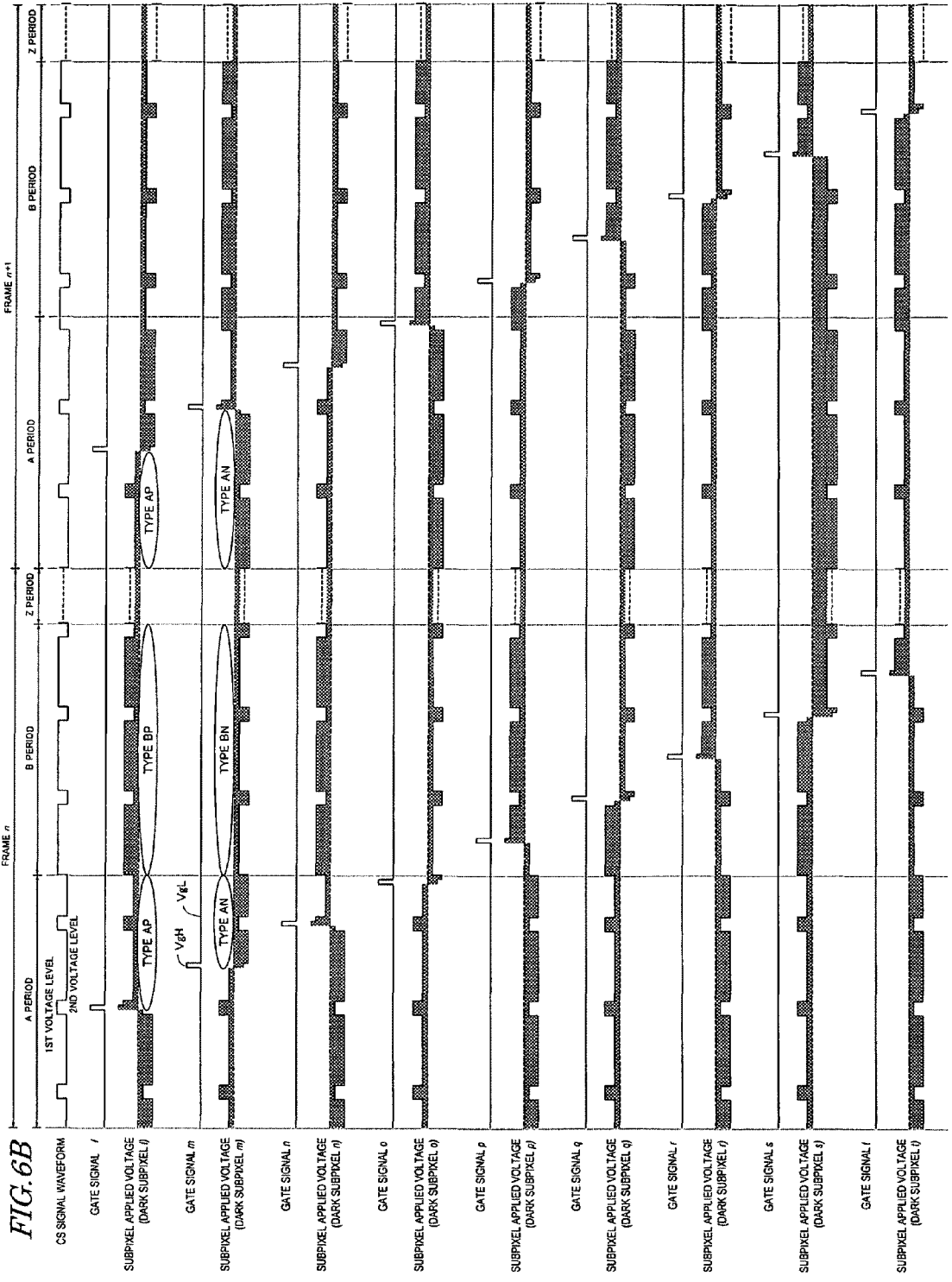

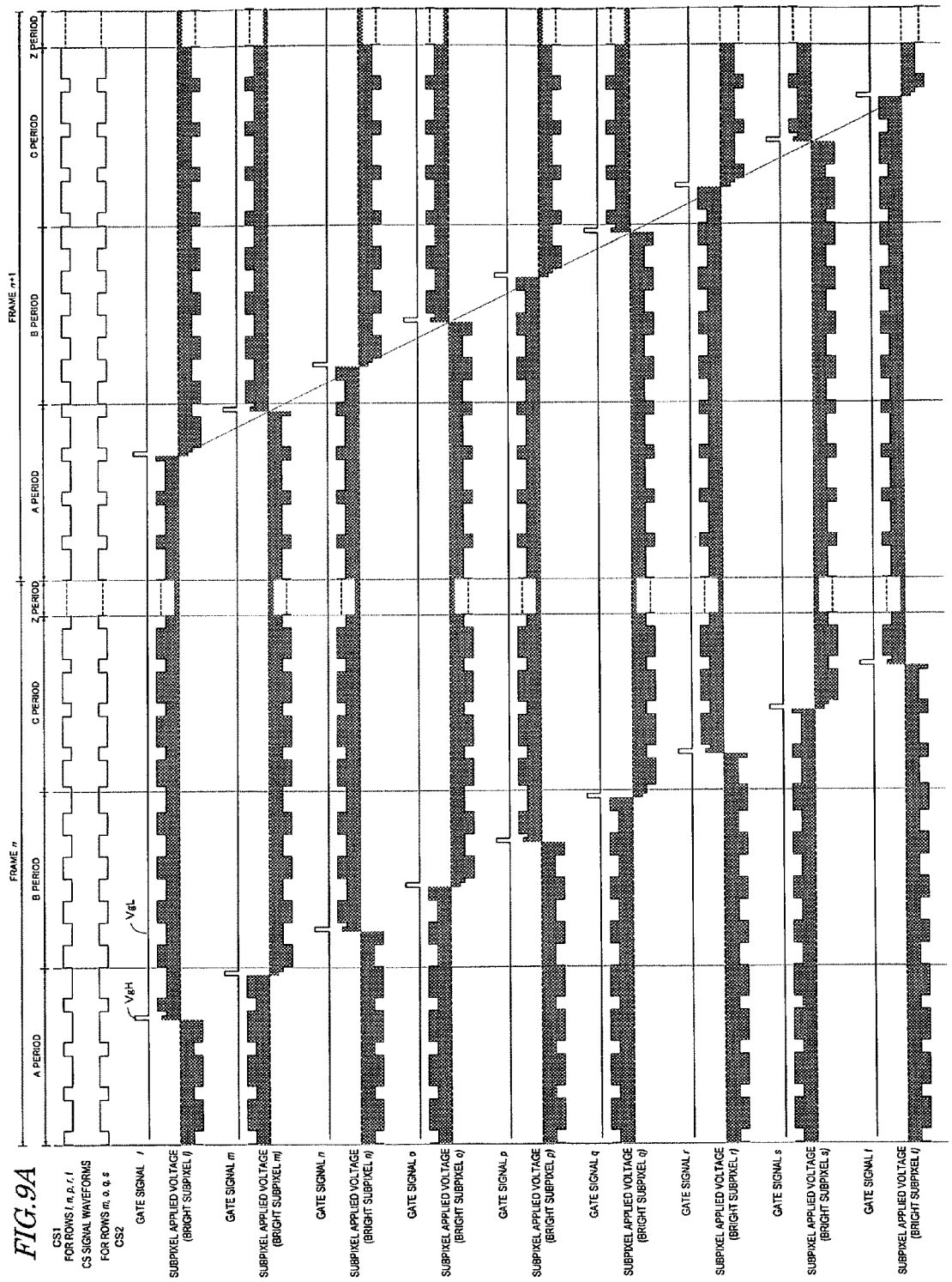

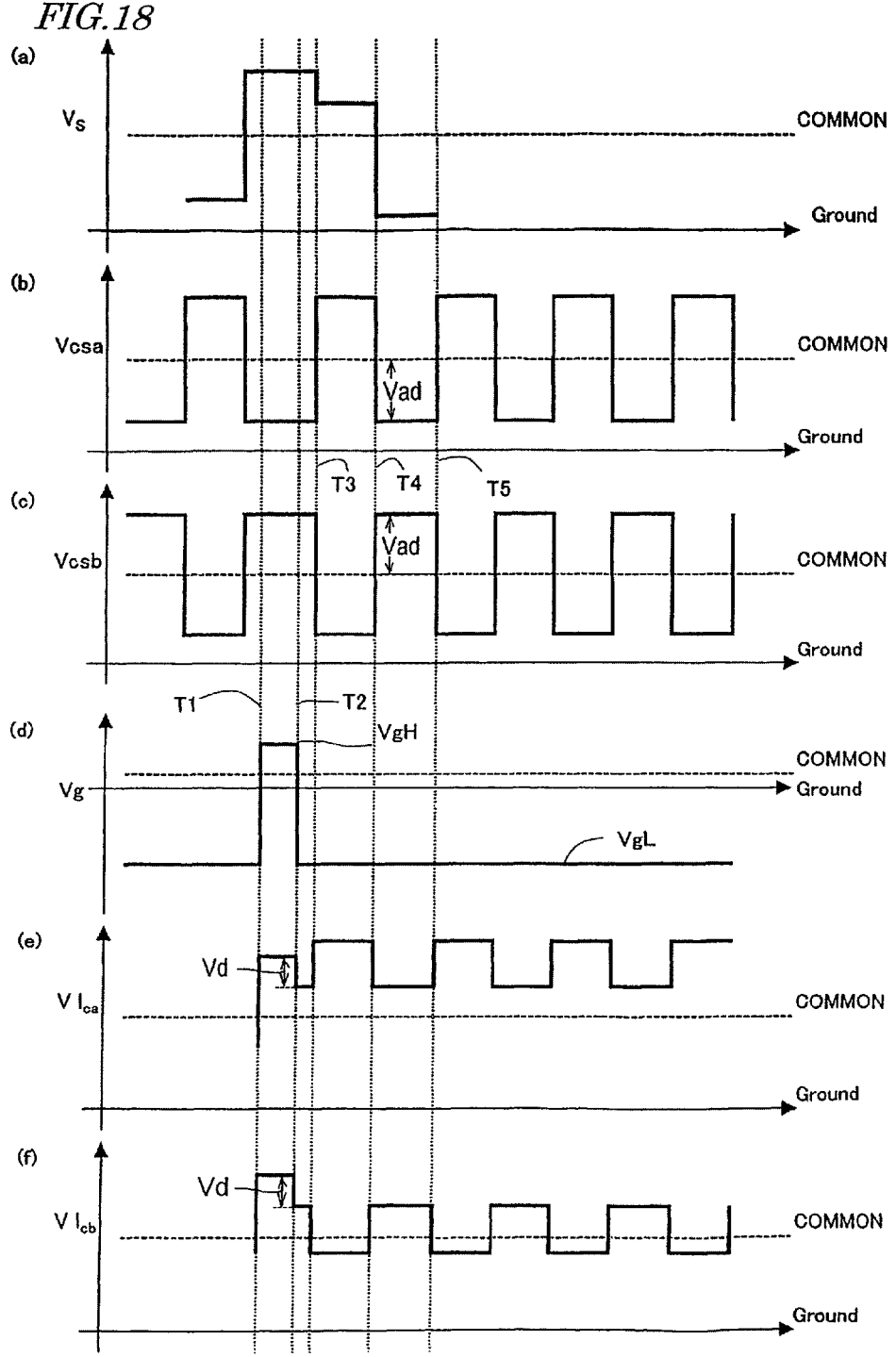

LIQUID CRYSTAL DISPLAY DEVICE

TECHNICAL FIELD

The present invention relates to a liquid crystal display device and a method for driving the device. More particularly, the present invention relates to a structure that can reduce the viewing angle dependence of the γ characteristic of a liquid crystal display device and a method for driving such a structure.

BACKGROUND ART

A liquid crystal display (LCD) is a flat-panel display that has a number of advantageous features including high resolution, drastically reduced thickness and weight, and low power dissipation. The LCD market has been rapidly expanding recently as a result of tremendous improvements in its display performance, significant increases in its productivity, and a noticeable rise in its cost effectiveness over competing technologies.

A twisted-nematic (TN) mode liquid crystal display device, which used to be used extensively in the past, is subjected to an alignment treatment such that the major axes of its liquid crystal molecules, exhibiting positive dielectric anisotropy, are substantially parallel to the respective principal surfaces of upper and lower substrates and are twisted by about 90 degrees in the thickness direction of the liquid crystal layer between the upper and lower substrates. When a voltage is applied to the liquid crystal layer, the liquid crystal molecules change their orientation directions into a direction that is parallel to the electric field applied. As a result, the twisted orientation disappears. The TN mode liquid crystal display device utilizes variation in the optical rotatory characteristic of its liquid crystal layer due to the change of orientation directions of the liquid crystal molecules in response to the voltage applied, thereby controlling the quantity of light transmitted.

The TN mode liquid crystal display device allows a broad enough manufacturing margin and achieves high productivity. However, the display performance (e.g., the viewing angle dependence of the γ characteristic, in particular) thereof is not fully satisfactory. More specifically, when an image on the screen of the TN mode liquid crystal display device is viewed obliquely, the contrast ratio of the image decreases significantly. In that case, even an image, of which the grayscales ranging from black to white are clearly observable when the image is viewed straightforward, loses much of the difference in luminance between those grayscales when viewed obliquely. Furthermore, the grayscale characteristic of the image being displayed thereon may sometimes invert itself. That is to say, a portion of an image, which looks darker when viewed straight, may look brighter when viewed obliquely. This is a so-called "grayscale inversion phenomenon".

To improve the viewing angle dependence of the γ characteristic of such a TN mode liquid crystal display device, an inplane switching (IPS) mode liquid crystal display device (see Patent Document No. 1), a multi-domain vertical aligned (MVA) mode liquid crystal display device (see Patent Document No. 2), an axisymmetric aligned (ASM) mode liquid crystal display device (see Patent Document No. 3), and a liquid crystal display device disclosed in Patent Document No. 4 were developed recently.

A liquid crystal display device operating in any of these newly developed wide viewing angle modes has overcome the problems about the viewing angle dependence of the γ characteristic that have been described specifically. That is to say, in such a liquid crystal display device, even when an image on the screen is viewed obliquely, the contrast ratio never decreases significantly or the grayscales never invert.

Although the display qualities of LCDs have been further improved nowadays, a γ characteristic's viewing angle dependence problem in a different phase has surfaced just recently. Specifically, the γ characteristic of LCDs would vary with the viewing angle. That is to say, the γ characteristic when an image on the screen is viewed straight is different from the characteristic when it is viewed obliquely. As used herein, the "γ characteristic" refers to the grayscale dependence of display luminance and will also be referred to herein as "grayscale luminance characteristic". That is why if the γ characteristic when the image is viewed straight is different from the characteristic when the same image is viewed obliquely, then it means that the grayscale display state changes according to the viewing direction. This is a serious problem particularly when a still picture such as a photo is presented or when a TV program is displayed.

The viewing angle dependence of the γ characteristic is more significant in the MVA and ASM modes rather than in the IPS mode. According to the IPS mode, however, it is more difficult to make panels that realize a high contrast ratio when the image on the screen is viewed straight with good productivity rather than in the MVA and ASM modes. Taking these circumstances into consideration, it is particularly necessary to reduce the viewing angle dependence of the γ characteristic of MVA and ASM mode liquid crystal display devices, among other things.

To overcome such a problem, the applicant of the present application disclosed a liquid crystal display device that can reduce the viewing angle dependence of the γ characteristic (or an excessively high contrast ratio of white portions of an image, among other things) by dividing a single pixel into a number of subpixels, and a method for driving such a device in Patent Document No. 5. Such a display or drive mode will sometimes be referred to herein as "area-grayscale display", "area-grayscale drive", "multi-pixel display" or "multi-pixel drive".

Patent Document No. 5 discloses a liquid crystal display device in which storage capacitors Cs are provided for respective subpixels SP of a single pixel P. In the storage capacitors, the storage capacitor counter electrodes (which are connected to CS bus lines) are electrically independent of each other between the subpixels. And by varying the voltages applied to the storage capacitor counter electrodes (which will be referred to herein as "storage capacitor counter voltages"), mutually different effective voltages can be applied to the respective liquid crystal layers of multiple subpixels by utilizing a capacitance division technique.

Hereinafter, the pixel division structure of the liquid crystal display device 200 disclosed in Patent Document No. 5 will be described with reference to FIG. 16. The entire disclosure of Patent Document No. 5 is hereby incorporated by reference.

The pixel 10 is split into a subpixel 10a and another subpixel 10b. To the subpixels 10a and 10b, connected are their associated TFTs 16a and 16b and their associated storage capacitors (CS) 22a and 22b, respectively. The gate electrodes of the TFTs 16a and 16b are both connected to the same scan line 12. And the source electrodes of the TFTs 16a and 16b are connected to the same signal line 14. The storage capacitors 22a and 22b are connected to their associated storage capacitor lines (CS bus lines) 24a and 24b, respectively. The storage capacitor 22a includes a storage capacitor electrode that is electrically connected to the subpixel electrode 18a, a storage capacitor counter electrode that is electrically connected to the storage capacitor line 24a, and an insulating layer (not shown) arranged between the electrodes. The storage capacitor 22b includes a storage capacitor electrode that is electrically connected to the subpixel electrode 18b, a storage capacitor counter electrode that is electrically connected to the storage capacitor line 24b, and an insulating layer (not shown) arranged between the electrodes. The respective storage capacitor counter electrodes of the storage capacitors 22a and 22b are independent of each other and have such a structure as receiving mutually different storage capacitor counter voltages from the storage capacitor lines 24a and 24b, respectively.

Hereinafter, the principle on which mutually different effective voltages can be applied to the respective liquid crystal layers of the two subpixels 10a and 10b of the liquid crystal display device 200 will be described with reference to the accompanying drawings.

FIG. 17 schematically shows the equivalent circuit of one pixel of the liquid crystal display device 200. In this electrical equivalent circuit, the liquid crystal layers of the subpixels 10a and 10b are identified by the reference numerals 13a and 13b, respectively. A liquid crystal capacitor formed by the subpixel electrode 18a, the liquid crystal layer 13a, and the counter electrode 17 will be identified by Clca. On the other hand, a liquid crystal capacitor formed by the subpixel electrode 18b, the liquid crystal layer 13b, and the counter electrode 17 will be identified by Clcb. The same counter electrode 17 is shared by these two subpixels 10a and 10b.

The liquid crystal capacitors Clca and Clcb are supposed to have the same electrostatic capacitance CLC (V) The value of CLC (V) depends on the effective voltages (V) applied to the liquid crystal layers of the respective subpixels 10a and 10b. Also, the storage capacitors 22a and 22b that are connected independent of each other to the liquid crystal capacitors of the respective subpixels 10a and 10b will be identified herein by Ccsa and Ccsb, respectively, which are supposed to have the same electrostatic capacitance CCS.

In the subpixel 10a, one electrode of the liquid crystal capacitor Clca and one electrode of the storage capacitor Ccsa are connected to the drain electrode of the TFT 16a, which is provided to drive the subpixel 10a. The other electrode of the liquid crystal capacitor Clca is connected to the counter electrode. And the other electrode of the storage capacitor Ccsa is connected to the storage capacitor line 24a. In the subpixel 10b, one electrode of the liquid crystal capacitor Clcb and one electrode of the storage capacitor Ccsb are connected to the drain electrode of the TFT 16b, which is provided to drive the subpixel 10b. The other electrode of the liquid crystal capacitor Clcb is connected to the counter electrode. And the other electrode of the storage capacitor Ccsb is connected to the storage capacitor line 24b. The gate electrodes of the TFTs 16a and 16b are both connected to the scan line 12 and the source electrodes thereof are both connected to the signal line 14.

Portions (a) through (f) of FIG. 18 schematically show the timings to apply respective voltages to drive the liquid crystal display device 200.

Specifically, portion (a) of FIG. 18 shows the voltage waveform Vs of the signal line 14; portion (b) of FIG. 18 shows the voltage waveform Vcsa of the storage capacitor line 24a; portion (c) of FIG. 18 shows the voltage waveform Vcsb of the storage capacitor line 24b; portion (d) of FIG. 18 shows the voltage waveform Vg of the scan line 12; portion (e) of FIG. 18 shows the voltage waveform Vlca of the pixel electrode 18a of the subpixel 10a; and portion (f) of FIG. 18 shows the voltage waveform Vlcb of the pixel electrode 18b of the subpixel 10b. In FIG. 18, the dashed line indicates the voltage waveform COMMON (Vcom) of the counter electrode 17.

Hereinafter, it will be described with reference to portions (a) through (f) of FIG. 18 how the equivalent circuit shown in FIG. 17 operates.

First, at a time T1, the voltage Vg rises from VgL to VgH to turn the TFTs 16a and 16b ON simultaneously. As a result, the voltage Vs on the signal line 14 is transmitted to the subpixel electrodes 18a and 18b of the subpixels 10a and 10b to charge the subpixels 10a and 10b with the voltage Vs. In the same way, the storage capacitors Csa and Csb of the respective subpixels are also charged with the voltage on the signal line.

Next, at a time T2, the voltage Vg on the scan line 12 falls from VgH to VgL to turn the TFTs 16a and 16b OFF simultaneously and electrically isolate the subpixels 10a and 10b and the storage capacitors Csa and Csb from the signal line 14. It should be noted that immediately after that, due to the feedthrough phenomenon caused by a parasitic capacitance of the TFTs 16a and 16b, for example, the voltages Vlca and Vlcb applied to the respective subpixel electrodes decrease by approximately the same voltage Vd to:

$$Vlca = Vs - Vd$$

$$Vlcb = Vs - Vd$$

respectively. Also, in this case, the voltages Vcsa and Vcsb on the storage capacitor lines are:

$$Vcsa = Vcom - Vad$$

$$Vcsb = Vcom + Vad$$

respectively.

Next, at a time T3, the voltage Vcsa on the storage capacitor line 24a connected to the storage capacitor Csa rises from Vcom−Vad to Vcom+Vad and the voltage Vcsb on the storage capacitor line 24b connected to the storage capacitor Csb falls from Vcom+Vad to Vcom−Vad. That is to say, these voltages Vcsa and Vcsb both change twice as much as Vad. As the voltages on the storage capacitor lines 24a and 24b change in this manner, the voltages Vlca and Vlcb applied to the respective subpixel electrodes change into:

$$Vlca = Vs - Vd + 2 \times Kc \times Vad$$

$$Vlcb = Vs - Vd - 2 \times Kc \times Vad$$

respectively, where Kc=CCS/(CLC(V)+CCS) and × is the symbol of multiplication.

Next, at a time T4, Vcsa falls from Vcom+Vad to Vcom−Vad and Vcsb rises from Vcom−Vad to Vcom+Vad. That is to say, these voltages Vcsa and Vcsb both change twice as much as Vad again. In this case, Vlca and Vlcb also change from $$Vlca = Vs - Vd + 2 \times Kc \times Vad$$

$$Vlcb = Vs - Vd - 2 \times Kc \times Vad$$

into $$Vlca = Vs - Vd$$

$$Vlcb = Vs - Vd$$

respectively.

Next, at a time T5, Vcsa rises from Vcom−Vad to Vcom+Vad and Vcsb falls from Vcom+Vad to Vcom−Vad. That is to say, these voltages Vcsa and Vcsb both change twice as much as Vad again. In this case, Vlca and Vlcb also change from $$Vlca=Vs-Vd$$

$$Vlcb=Vs-Vd$$

into $$Vlca=Vs-Vd+2\times Kc\times Vad$$

$$Vlcb=Vs-Vd-2\times Kc\times Vad$$

respectively.

After that, every time a period of time that is an integral number of times as long as one horizontal scanning period (or one horizontal write period) 1H has passed, the voltages Vcsa, Vcsb, Vlca and Vlcb alternate their levels at the times T4 and T5. Consequently, the effective values of the voltages Vlca and Vlcb applied to the subpixel electrodes become:

$$Vlca=Vs-Vd+Kc\times Vad$$

$$Vlcb=Vs-Vd-Kc\times Vad$$

respectively.

Therefore, the effective voltages V1 and V2 applied to the liquid crystal layers 13a and 13b of the subpixels 10a and 10b become:

$$V1=Vlca-Vcom$$

$$V2=Vlcb-Vcom$$

That is to say, $$V1=Vs-Vd+Kc\times Vad-Vcom$$

$$V2=Vs-Vd-Kc\times Vad-Vcom$$

respectively.

As a result, the difference $\Delta V12$ ($=V1-V2$) between the effective voltages applied to the liquid crystal layers 13a and 13b of the subpixels 10a and 10b becomes $\Delta V12=2\times Kc\times Vad$ (where $Kc=CCS/(CLC(V)+CCS)$). Thus, mutually different voltages can be applied to the liquid crystal layers 13a and 13b.

Patent Document No. 1: Japanese Patent Gazette for Opposition No. 63-21907
Patent Document No. 2: Japanese Patent Application Laid-Open Publication No. 11-242225
Patent Document No. 3: Japanese Patent Application Laid-Open Publication No. 10-186330
Patent Document No. 4: Japanese Patent Application Laid-Open Publication No. 2002-55343
Patent Document No. 5: Japanese Patent Application Laid-Open Publication No. 2004-62146

DISCLOSURE OF INVENTION

Problems to be Solved by the Invention

In the pixel division structure disclosed in Patent Document No. 5, the greater the pixel division number (i.e., the number of subpixels into which a pixel is divided), the lighter the viewing angle dependence of the γ characteristic but the lower the transmittance (i.e., the aperture ratio of the pixel) as well.

In order to overcome the problems described above, the present invention has an object of providing a liquid crystal display device that can reduce the viewing angle dependence of the γ characteristic while minimizing the decrease in transmittance (the aperture ratio of a pixel) and also providing a method for driving such a device.

Means for Solving the Problems

A liquid crystal display device according to the present invention includes a plurality of pixels that are arranged in columns and rows so as to form a matrix pattern. Each pixel includes a liquid crystal layer and a plurality of electrodes for applying a voltage across the liquid crystal layer. Each pixel includes a first subpixel SP1 and a second subpixel SP2, having liquid crystal layers to which mutually different voltages are applicable in displaying a certain grayscale. Each of the first and second subpixels SP1 and SP2 includes a liquid crystal capacitor formed by a counter electrode and a subpixel electrode that faces the counter electrode through the liquid crystal layer, and a storage capacitor formed by a storage capacitor electrode that is electrically connected to the subpixel electrode, an insulating layer, and a storage capacitor counter electrode that is opposed to the storage capacitor electrode with the insulating layer interposed between them. The counter electrode is a single electrode provided in common for the first and second subpixels SP1 and SP2, while the storage capacitor counter electrodes of the first and second subpixels SP1 and SP2 are electrically independent of each other. Every vertical scanning period V-Total of an input video signal, a common display signal voltage is applied to the respective subpixel electrodes of the first and second subpixels SP1 and SP2, and storage capacitor counter voltages applied independently to the storage capacitor counter electrodes of the first and second subpixels SP1 and SP2 are varied within each vertical scanning period of the input video signal, whereby each vertical scanning period V-Total of the input video signal includes a first subframe SFA in which the first and second subpixels SP1 and SP2 have luminances Y_SP1_A and Y_SP2_A, respectively, and a second subframe SFB in which the first and second subpixels SP1 and SP2 have luminances Y_SP1_B and Y_SP2_B, respectively, where Y_SP1_A≠Y_SP2_A, Y_SP1_B≠Y_SP2_B, and Y_SP1_A≠Y_SP1_B or Y_SP2_A≠Y_SP2_B are satisfied. Naturally, all of Y_SP1_A≠Y_SP2_A, Y_SP1_B≠Y_SP2_B, Y_SP1_A≠Y_SP1_B and Y_SP2_A≠Y_SP2_B may be satisfied at the same time, where ≠ is a mathematical symbol meaning "not equal to".

In one preferred embodiment, the liquid crystal display device further includes a plurality of storage capacitor lines, each of which is connected to the storage capacitor counter electrodes of the first and second subpixels SP1 and SP2 of an associated one of the pixels, and the storage capacitor lines are electrically independent of each other.

In another preferred embodiment, the liquid crystal display device further includes: a plurality of storage capacitor lines, each of which is connected to the storage capacitor counter electrodes of the first and second subpixels SP1 and SP2 of an associated one of the pixels, and a number of storage capacitor trunks that are electrically independent of each other. Each of the storage capacitor lines is connected to an associated one of the storage capacitor trunks.

In still another preferred embodiment, the storage capacitor counter voltages are oscillating voltages. In a vertical scanning period V-Total of the input video signal, the storage capacitor counter voltages applied to the respective storage capacitor counter electrodes of the first and second subpixels SP1 and SP2 have phases that are different from each other by 180 degrees.

In yet another preferred embodiment, the storage capacitor counter voltages are oscillating voltages. And the storage capacitor counter voltages applied to the storage capacitor counter electrode of the first subpixel in the first and second subframes SFA and SFB of a vertical scanning period V-Total of the input video signal have mutually different amplitudes.

Effects of the Invention

In the liquid crystal display device of the present invention, each pixel is divided not just spatially but also temporally. That is why compared to a conventional pixel division structure in which each pixel is divided only spatially, the liquid crystal display device of the present invention achieves a similar degree of viewing angle dependence of the γ characteristic and higher transmittance.

BRIEF DESCRIPTION OF DRAWINGS

FIGS. 1(a) and 1(b) are schematic representations illustrating the pixel structure of Conventional LCD 1 and how it operates, wherein FIG. 1(a) is an equivalent circuit diagram of a single pixel thereof and FIG. 1(b) shows how the luminance, gate voltage and storage capacitor counter voltage (CS voltage) of the pixel change with time.

FIGS. 2(a) and 2(b) are schematic representations illustrating the pixel structure of Conventional LCD 2 and how it operates, wherein FIG. 2(a) is an equivalent circuit diagram of a single pixel thereof and FIG. 2(b) shows how the luminance, gate voltage and storage capacitor counter voltage (CS voltage) of the pixel change with time.

FIG. 4B schematically illustrates the waveforms of CS voltages applied to Conventional LCD 2 with the pixel division structure shown in FIG. 2(a) and effective voltages applied to the respective liquid crystal layers of the subpixels when the subpixels are dark subpixels.

FIG. 6A illustrates the waveforms of CS voltages applied to Inventive LCD 1 and the effective voltages applied to subpixels when the subpixels are bright subpixels.

FIG. 6B illustrates the waveforms of CS voltages applied to Inventive LCD 1 and the effective voltages applied to subpixels when the subpixels are dark subpixels.

FIG. 9A illustrates the waveforms of CS voltages applied to Inventive LCD 2 and the effective voltages applied to subpixels when the subpixels are bright subpixels.

Figure 3:
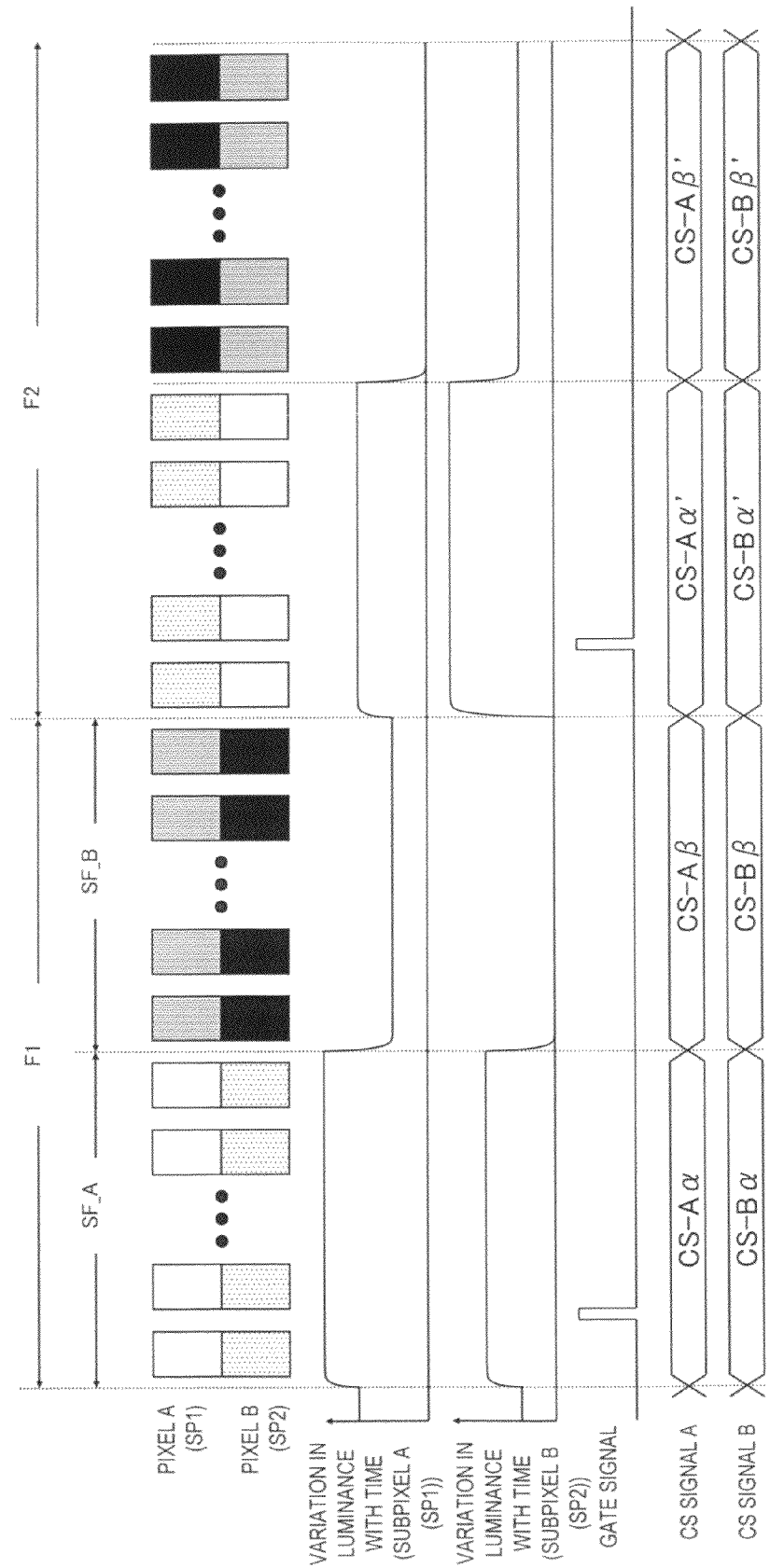
FIG. 3 is a schematic representation illustrating how the Inventive LCD operates by showing how the luminance, gate voltage and storage capacitor counter voltage (CS voltage) of each pixel change with time.

Portions (a) through (f) of FIG. 18 show the waveforms of voltages applied to drive the liquid crystal display device 200.

DESCRIPTION OF REFERENCE NUMERALS 10 pixel
10a, 10b subpixel
12 scan line (gate bus line)
14a, 14b signal line (source bus line)
16a, 16b TFT
18a, 18b subpixel electrode
200 liquid crystal display device

BEST MODE FOR CARRYING OUT THE INVENTION

Hereinafter, the configuration and operation of a liquid crystal display device as a preferred embodiment of the present invention and a method for driving such a device will be described with reference to the accompanying drawings.

First of all, the features of a liquid crystal display device as a preferred embodiment of the present invention (which will be referred to herein as "Inventive LCD") will be described briefly by comparing the Inventive LCD to a typical conventional liquid crystal display device that is not subjected to the multi-pixel drive (which will be referred to herein as "Conventional LCD 1") and the liquid crystal display device to be subjected to the multi-pixel drive as disclosed in Patent Document No. 5 (which will be referred to herein as "Conventional LCD 2").

FIGS. 1(a) and 1(b) are schematic representations illustrating the pixel structure of Conventional LCD 1 and how it operates, wherein FIG. 1(a) is an equivalent circuit diagram of a single pixel thereof and FIG. 1(b) shows how the luminance, gate voltage and storage capacitor counter voltage (CS voltage) of the pixel change with time. FIGS. 2(a) and 2(b) are schematic representations illustrating the pixel structure of Conventional LCD 2 and how it operates, wherein FIG. 2(a) is an equivalent circuit diagram of a single pixel thereof and FIG. 2(b) shows how the luminance, gate voltage and storage capacitor counter voltage (CS voltage) of the pixel change with time. And FIG. 3 is a schematic representation illustrating how the Inventive LCD operates by showing how the luminance, gate voltage and storage capacitor counter voltage (CS voltage) of each pixel change with time. It should be noted that each pixel of the Inventive LCD is represented by the same equivalent circuit diagram as the one shown in FIG. 2(a) but the Inventive LCD has different CS voltage waveforms from the ones shown in FIG. 2(a).

FIGS. 1(b), 2(b) and 3 show the variations in those levels of the liquid crystal display devices over two vertical scanning periods. In this case, the display signal voltage is supposed to be constant over the two consecutive vertical scanning periods. As used herein, one "vertical scanning period" is defined to be an interval between a point in time when one scan line is selected to write a display signal voltage and a point in time when that scan line is selected to write the next display signal voltage. In each of these drawings, while the gate voltage is high, the associated scan line (gate bus line) is selected and the display signal voltage is written on a pixel electrode (i.e., a subpixel electrode) by way of an associated signal line (source bus line). Also, each of one frame period of a non-interlaced drive input video signal and one field period of an interlaced drive input video signal will be referred to herein as "one vertical scanning period of the input video signal". Normally, one vertical scanning period of a liquid crystal display device corresponds to one vertical scanning period of the input video signal. In the example to be described below, one vertical scanning period of the liquid crystal display panel is supposed to correspond to that of the input video signal for the sake of simplicity. However, the present invention is in no way limited to that specific preferred embodiment. Alternatively, the present invention is also applicable to a so-called "2× drive" with a vertical scanning frequency of 120 Hz in which two vertical scanning periods of the liquid crystal display panel (that lasts 2×1/120 sec, for example) are allocated to one vertical scanning period of the input video signal (that lasts 1/60 sec, for example).

As shown in FIG. 1(a), in Conventional LCD 1, a single liquid crystal capacitor Clc and a single storage capacitor Cs are provided for each pixel, and a counter voltage Vcom to be applied to a counter electrode that is normally arranged so as to face a pixel electrode through a liquid crystal layer (which will also be referred to herein as a "common electrode") is supplied as the CS voltage. Unless otherwise stated, each voltage waveform is illustrated herein by reference to the counter voltage. In FIG. 1(b), Vcom is supplied as the CS voltage and a situation where the same display signal voltage is written on the pixel electrode over two consecutive vertical scanning periods is illustrated. As shown in FIG. 1(b), in Conventional LCD 1, the entire pixel shows a constant luminance through the two vertical scanning periods. That is why this pixel can be said as having a "spatial division number" of one and a "temporal division number" of one. In this example, one vertical scanning period of the liquid crystal display device is supposed to be as long as one frame (1F) and an associated display signal voltage is supplied to the pixel electrode every frame.

In Conventional LCD 2 shown in FIG. 2(a), each pixel has two subpixels A and B. Subpixel A includes a liquid crystal capacitor Clca and a CS capacitor Ccsa, while subpixel B includes a liquid crystal capacitor Clcb and a CS capacitor Ccsb. A CS voltage CS-A is applied to the storage capacitor counter electrode of Ccsa, while a CS voltage CS-B is applied to the storage capacitor counter electrode of Ccsb. As schematically shown in FIG. 2(a), two oscillating voltages, of which the phases are different from each other by 180 degrees (e.g., rectangular waves having a duty ratio of one to one) are typically supplied as the CS voltages. As a result, as shown in FIG. 2(b), one subpixel (e.g., subpixel A in this example) becomes a bright subpixel and the other subpixel (e.g., subpixel B in this example) becomes a dark subpixel. When a display signal voltage corresponding to a half tone is applied, Conventional LCD 2 displays a luminance representing the display signal voltage applied to the subpixel electrodes as the average (i.e., the area average) of the luminances displayed by the bright and dark subpixels that are respectively higher and lower than the luminance (or grayscale) represented by the display signal voltage. That is why this pixel has a spatial division number of two. On the other hand, each of these two subpixels A and B has a constant luminance through the two consecutive vertical scanning periods. Thus, this pixel has a temporal division number of one. The present inventors discovered and confirmed via experiments that by increasing the pixel division number (i.e., the spatial division number) of Conventional LCD 2, the viewing angle dependence of the γ characteristic could be reduced. However, as can be seen easily by comparing FIG. 2(b) to FIG. 1(b), if a pixel were split, then the area not contributing to display would increase and the transmittance (or the aperture ratio of the pixel) would decrease.

An LCD as a preferred embodiment of the present invention is characterized in that the spatially divided pixel of Conventional LCD 2 is also divided temporally. To divide a pixel temporally will be sometimes referred to herein as "luminance modulation". Inventive LCD has the same pixel division structure as Conventional LCD 2 shown in FIG. 2(a) but is different from Conventional LCD 2 in that each frame is also split into two.

In this example, each frame is split into two subframes SF_A and SF_B as shown in FIG. 3, and each of the subpixels A and B has two different luminances in the subframes SF_A and SF_B. Therefore, a single pixel is divided into four (=2× 2). In the example illustrated in FIG. 3, each of the subpixels A and B has a lower luminance in the subframe SF_A than in the subframe SF_B. The luminance displayed by a single pixel in one frame (i.e., a luminance representing the display signal voltage) becomes the average of the luminances in these two subframes SF_A and SF_B.

Supposing the spatial division number is m and the temporal division number is n, the effective division number becomes their product, i.e., m×n, as described above. It should be noted that the temporal division does not involve any decrease in pixel aperture ratio. That is why by introducing the temporal division, the division number can be increased without decreasing the pixel aperture ratio, which would otherwise be caused if the pixel division number were increased just spatially. Consequently, Inventive LCD in which each pixel is divided into n temporally can have n times as large a pixel division number as Conventional LCD 2.

An LCD as a preferred embodiment of the present invention is characterized in that the difference in luminance between the subframes is produced by the CS voltage. As shown in FIG. 3, each of the CS voltages CS-A and CS-B changes (from α into β) every subframe, thereby changing the luminances of each subpixel on a subframe-by-subframe basis. That is to say, although the display signal voltage is applied to each pixel electrode only once a frame, each CS voltage has its levels changed within one scanning period (which will be sometimes referred to herein as "CS voltage waveform modulation) without shortening one vertical scanning period of the liquid crystal display device (or without increasing the vertical scanning frequency thereof), thereby dividing the pixel temporally. For that reason, unlike a driving method in which one vertical scanning period is shortened, the write scanning control never gets complicated or the time for charging each pixel capacitor never becomes shorter, either. Consequently, the time for getting a write scanning of the display signal voltage done once (i.e., one vertical scanning period) can be as long as that of a typical liquid crystal display device or Conventional LCD 2.

Hereinafter, it will be described in detail with reference to FIG. 3 exactly how the 2×2 divided Inventive LCD operates. In the following description, the subpixels A and B that can display mutually different luminances will be referred to herein as a "first subpixel SP1" and a "second subpixel SP2", respectively. Each of these subpixels SP1 and SP2 has its luminance levels changed (i.e., subjected to a luminance modulation) every subframe, which is a half as long as one frame. That is why in this Inventive LCD, the luminance displayed by each pixel in one frame is divided into four. The luminance Y displayed by a pixel in one frame (i.e., the luminance (or grayscale) representing the display signal voltage supplied per frame) can be represented by the following Equation (1):

$$Y = (Y\_SP1\_A + Y\_SP1\_B + Y\_SP2\_A + Y\_SP2\_B)/4 \quad (1)$$

where Y_SP1_A is the luminance of the subpixel SP1 during the subframe period SFA, Y_SP1_B is the luminance of the subpixel SP1 during the subframe period SFB, Y_SP2_A is the luminance of the subpixel SP2 during the subframe period SFA, and Y_SP2_B is the luminance of the subpixel SP2 during the subframe SFB.

This Equation (1) represents a situation where each pixel is equally split into two both spatially and temporally alike. That is to say, this is an equation representing a situation where four divided luminances equally contribute to displaying the luminance Y of a pixel. On the other hand, a situation where the luminance of a pixel is not equally split spatially and temporally may be represented in the following manner.

Supposing the area of a pixel is S and the areas of its subpixels SP1 and SP2 are S_SP1 and S_SP2, respectively, the area ratios of these subpixels are given by S_SP1/S and S_SP2/S, respectively. Also, supposing one frame period is T and respective periods of the subframes SFA and SFB are T_SFA and T_SFB, the period ratios of these subframes are given by T_SFA/T and T_SFB/T, respectively. That is why the luminance Y displayed by the pixel is represented by the following Equation (2):

$$Y = Y\_SP1\_A \times (S\_SP1)/S \times (T\_SFA)/T + \quad (2)$$
$$Y\_SP1\_B \times (S\_SP1)/S \times (T\_SFB)/T +$$
$$Y\_SP2\_A \times (S\_SP2)/S \times (T\_SFA)/T +$$
$$Y\_SP2\_B \times (S\_SP2)/S \times (T\_SFB)/T$$

Naturally, the luminance of a pixel does not have to be split into two either spatially or temporally. Instead, supposing the spatial division number is m and the temporal division number is n, the luminance Y displayed by a pixel may also be represented by the following Equation (3) just like Equation (2):

$$Y = \sum_{k=1}^{m} \sum_{l=1}^{n} \{Y\_SP(k)\_(l) \times (S\_SP(k))/S \times (T\_SF(l))/T\} \quad (3)$$

where $Y\_SP(k)\_(l)$ represents the luminance of a $k^{th}$ one of m spatially divided subpixels in an $l^{th}$ one of n divided subframes.

In this case, the subpixels may be numbered arbitrarily unless multiple subpixels are identified by the same number.

A liquid crystal display device as a preferred embodiment of the present invention achieves not only the viewing angle dependence of the γ characteristic comparable to that of a pixel that has been divided into n×m subpixels by using a pixel that has been spatially divided into m subpixels but also as high a pixel aperture ratio as that of Conventional LCD 2 in which a pixel is divided spatially into m subpixels. In addition, since the temporal division is done by modulating the CS voltage, there is no need to shorten one vertical scanning period. As a result, the time for writing the display signal voltage is never shorter than in Conventional LCD 2.

Hereinafter, a liquid crystal display device according to the present invention and a method for driving the device will be described in detail by way of specific preferred embodiments.

First of all, it will be described with reference to the accompanying drawings how the liquid crystal display device of the present invention (i.e., Inventive LCD) modulates the waveforms of CS voltages in comparison with the conventional multi-pixel drive method (i.e., Conventional LCD 2). The following description will be focused on how the effective voltages applied to the subpixels may be different even though the same display signal voltage is applied to the subpixels by paying attention to the difference between the effective voltages actually applied to the respective subpixels.

Figure 4A:
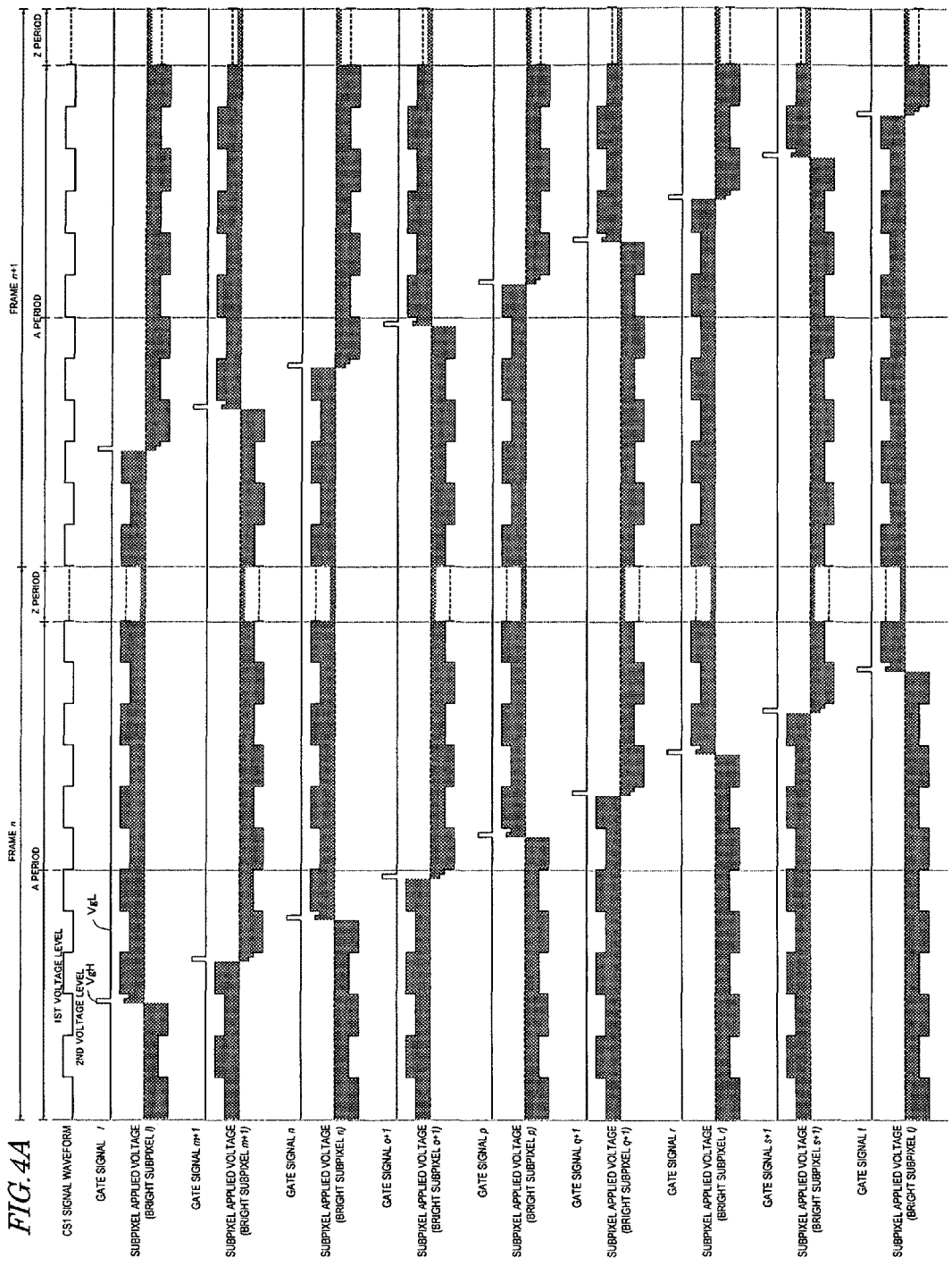
FIG. 4A schematically illustrates the waveforms of CS voltages applied to Conventional LCD 2 with the pixel division structure shown in FIG. 2(a) and effective voltages applied to the respective liquid crystal layers of the subpixels when the subpixel are bright subpixels.
Figure 4C:
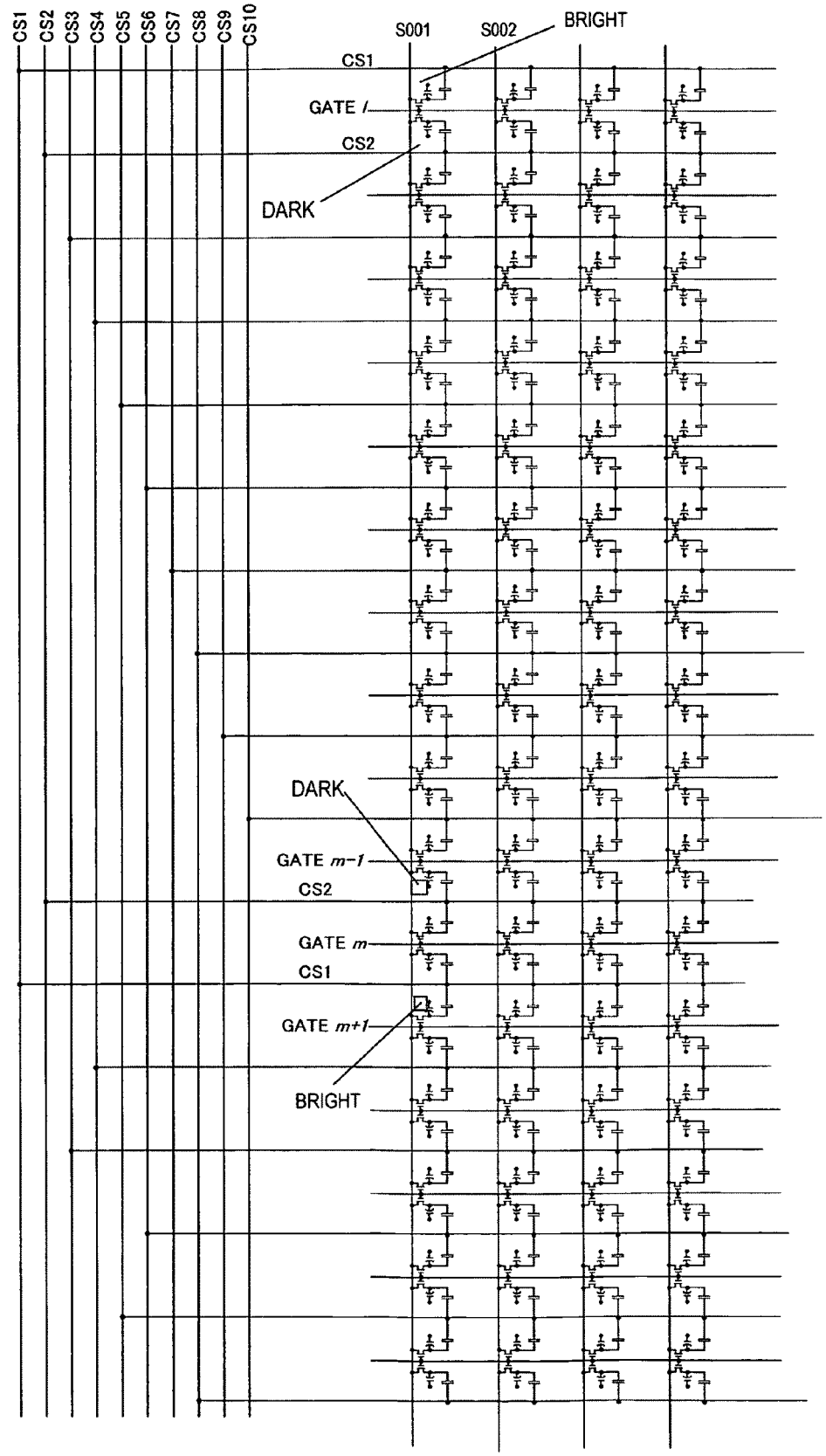
FIG. 4C is an equivalent circuit diagram illustrating how CS bus lines are connected to the respective storage capacitors of subpixels in Conventional LCD 2 with the pixel division structure shown in FIG. 2(a).

FIGS. 4A and 4B schematically illustrate the waveforms of CS voltages applied to Conventional LCD 2 with the pixel division structure shown in FIG. 2(a) and effective voltages applied to the respective liquid crystal layers of the subpixels. And FIG. 4C illustrates how CS bus lines are connected to the respective storage capacitors of subpixels. In these drawings, the gate bus lines (corresponding to rows of pixels) are identified by l, m, o, q, r, s and t, which are integers that are equal to or greater than one and that represent the respective numbers of the gate bus lines. Naturally, these signs are totally different from the signs (including m and n) representing the division numbers.

FIG. 4A illustrates waveforms for the bright subpixel, while FIG. 4B illustrates waveforms for the dark subpixel. In FIGS. 4A and 4B, shown at the top is the signal waveform of the CS voltage applied to the storage capacitor counter electrode (or the CS bus line) of that subpixel. And under the CS voltage waveform, shown are the waveforms of a gate voltage applied to multiple arbitrary subpixels and voltages applied to the subpixel (i.e., the voltage applied to the subpixel electrode thereof). The dashed line shown on the subpixel applied voltages indicates the counter electrode voltage. Consequently, the effective voltage applied to the liquid crystal layer of each subpixel becomes the effective value of the shadowed portions shown in FIG. 4A or 4B.

Look how the CS voltage waveform changes with time, and it can be seen that in an interval between a point in time when the gate voltage for an arbitrary pixel becomes VgH (to turn the TFT ON) and a point in time when the same voltage becomes VgH next time (to turn the TFT ON again), which corresponds to one vertical scanning period (e.g., one frame in this example), there are two kinds of waveforms, i.e., a waveform for a Z period and a waveform for an A period.

The Z period is provided for a vertical blanking interval, which is included in each vertical scanning period of the input video signal, to regulate the waveform of the CS voltage. In general, one vertical scanning period (which will be referred to herein as "V-Total") of an input video signal is made up of an effective display period (which will be referred to herein as "V-Disp") in which video is presented and a vertical blanking interval (which will be referred to herein as "V-Blank") in which no video is presented. The effective display period for presenting video is determined by the display area (or the number of effective pixels) of an LCD panel. On the other hand, the vertical blanking interval is an interval for signal processing, and therefore, is not always constant but changes from one manufacturer of TV receivers to another. For instance, if the display area has 768 rows of pixels (in an XGA), the effective scanning period is fixed at 768×one horizontal scanning period (H) (which will be identified herein by "768H"). However, in one case, one vertical blanking interval may be 35H and one vertical scanning period V-Total may be 803H. In another case, one vertical blanking interval may be 36H and one vertical scanning period V-Total may be 804H. Furthermore, the length of one vertical blanking interval may even alternate between an odd number and an even number (e.g., 803H and 804H) every vertical scanning period. That is to say, if the vertical blanking interval V-Blank of the input video signal varied, processing to avoid display defects is carried out in the Z period, which does not contribute to modulating the luminance of a subpixel that is one of the objects of the present invention. That is to say, in the Z and A periods shown in FIGS. 4A and 4B, the same effective voltage is applied to a subpixel and that subpixel has the same display luminance. In other words, from the point of view of modulating the display luminance of a subpixel, the CS voltage waveforms shown in FIGS. 4A and 4B consist of only one type of waveforms, i.e., the ones for the A period.

In this example, the CS voltage waveform in the A period is a rectangular wave that oscillates alternately between first and second voltage levels and that has a duty ratio of one to one. However, the CS voltage waveforms shown in FIGS. 4A and 4B are defined so as to have phases that are different from each other by 180 degrees, and therefore, different voltages are applied to each subpixel in these two cases. Specifically, according to the CS voltage waveform shown in FIG. 4A, the first change of voltages after the gate voltage has fallen from VgH to VgL is a rise in a subpixel on which a positive (+) voltage is written but a fall in a subpixel on which a negative (−) voltage is written. As a result, the effective voltage applied to the subpixel (as indicated by the shadow in FIG. 4A) becomes greater than the display signal voltage supplied from the signal line to the subpixel electrode (i.e., the voltage written while the gate voltage is VgH). On the other hand, according to the CS voltage waveform shown in FIG. 4B, the first change of voltages after the gate voltage has fallen from VgH to VgL is a fall in a subpixel on which a positive (+) voltage is written but a rise in a subpixel on which a negative (−) voltage is written. As a result, the effective voltage applied to the subpixel (as indicated by the shadow in FIG. 4B) becomes smaller than the display signal voltage supplied from the signal line to the subpixel electrode (i.e., the voltage written while the gate voltage is VgH). In this manner, although the display signal voltages applied to the respective subpixel electrodes of the two subpixels are the same, the effective voltages applied to those subpixels (as indicated by the shadow in FIG. 4A or 4B) are different just as already described with reference to FIG. 18.

Figure 5:
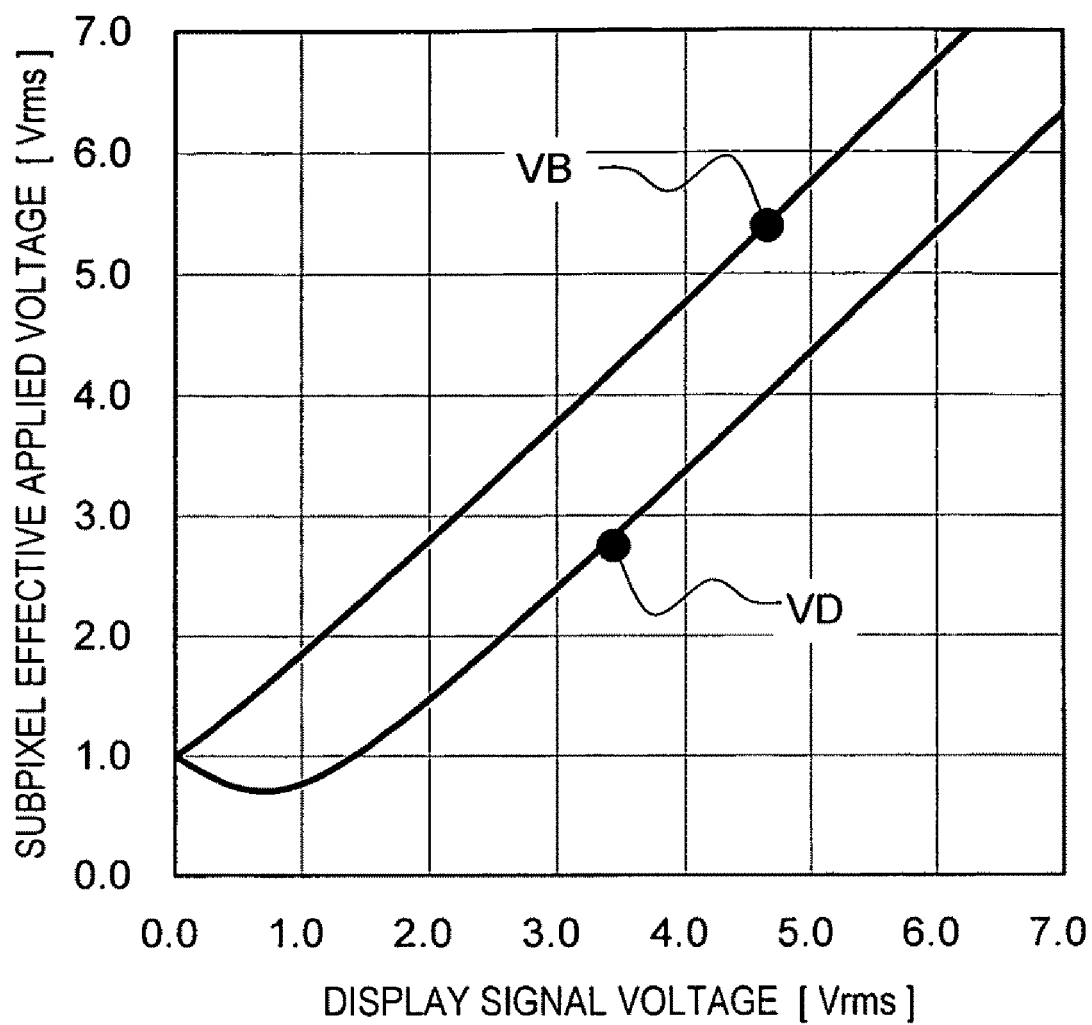
FIG. 5 is a graph showing how the effective voltage applied to a subpixel changes with the display signal voltage (or signal line voltage) in Conventional LCD 2 shown in FIGS. 4A and 4B.

FIG. 5 shows how the effective voltage applied to a subpixel changes with the display signal voltage (or signal line voltage) in Conventional LCD 2 shown in FIGS. 4A and 4B. As can be seen from FIG. 5, in a range where the effective voltages applied to subpixels are higher than the threshold voltage of the liquid crystal layer, even though the same display signal voltage is applied, the effective voltage applied to the liquid crystal layer of a subpixel is sometimes high (e.g., the effective voltage VB applied to a bright subpixel) and sometimes low (e.g., the effective voltage VD applied to a dark subpixel). In FIG. 5, a variation in the electrostatic capacitance of the liquid crystal layer with the voltage applied to the liquid crystal layer is not taken into consideration for the sake of simplicity of description. Generally speaking, the lower the voltage applied to a liquid crystal layer, the smaller the electrostatic capacitance of the liquid crystal layer tends to be. That is why the lower the voltage applied to a liquid crystal layer, the greater the difference between the voltages applied to subpixels (e.g., the voltage difference between VB and VD).

Hereinafter, the configuration and operation of a liquid crystal display device as a preferred embodiment of the present invention (i.e., Inventive LCD) will be described.

Embodiment 1

FIGS. 6a and 6b Illustrate the Waveforms of Cs Voltages applied to multi-pixel driven Inventive LCD 1 as a first preferred embodiment of the present invention and the effective voltages applied to subpixels. Inventive LCD 1 has the same pixel division structure as the one shown in FIG. 2(a) and also has the same connection pattern between CS bus lines and storage capacitors of respective subpixels as the one shown in FIG. 4C. FIGS. 6A and 6B respectively correspond to FIGS. 4A and 4B for Conventional LCD 2. That is to say, FIG. 6A illustrates waveforms for a bright subpixel and FIG. 6B illustrates waveforms for a dark subpixel.

Look how the CS voltage waveforms shown in FIGS. 6A and 6B change with time, and it can be seen that in an interval between a point in time when the gate voltage for an arbitrary pixel becomes VgH (to turn the TFT ON) and a point in time when the same voltage becomes VgH next time (to turn the TFT ON again), which corresponds to one vertical scanning period (e.g., one frame in this example), there are three kinds of waveforms, i.e., a waveform for an A period, a waveform for a B period, and a waveform for a Z period. In Conventional LCD 2, each CS voltage waveform consists of only Z periods and A periods as shown in FIGS. 4A and 4B. On the other hand, in Inventive LCD 2, each CS voltage waveform has A, B and Z periods as shown in FIGS. 6A and 6B. And the Z period is the same in both of these two types of LCDs. That is to say, the CS voltage waveform of Inventive LCD 1 has A and B periods to make the effective voltages applied to the subpixel and the display luminances of the subpixel different from each other.

In this example, by making the CS voltage waveform have two different duty ratios in the A and B periods, the effective voltages applied to the subpixel and the display luminances of the subpixel can be different from each other between the A and B periods.

Supposing the A and B periods will be referred to herein as "first subframe" and "second subframe", respectively, one vertical scanning period V-Total of the input video signal includes a first subframe SFA in which the first and second subpixels SP1 and SP2 have luminances Y_SP1_A and Y_SP2_A, respectively, and a second subframe SFB in which the first and second subpixels SP1 and SP2 have luminances Y_SP1_B and Y_SP2_B, respectively, where Y_SP1_A≠Y_SP2_A, Y_SP1_B≠Y_SP2_B, and Y_SP1_A≠Y_SP1_B and Y_SP2_A≠Y_SP2_B are satisfied.

Look at the CS voltage waveform for the bright subpixel (which will be identified herein by SP1) shown in FIG. 6A, and it can be seen that a proportion of the A period with a first voltage level is longer than the rest of the A period with a second voltage level and that a proportion of the B period with the first voltage level is shorter than the rest of the B period with the second voltage level. That is to say, comparing the averages of the CS voltage waveform between the A and B period, it can be seen that the A period has a greater value than the B period.

On the other hand, look at the CS voltage waveform for the dark subpixel (which will be identified herein by SP2) shown in FIG. 6B, and it can be seen that a proportion of the A period with the first voltage level is shorter than the rest of the A period with the second voltage level and that a proportion of the B period with the first voltage level is longer than the rest of the B period with the second voltage level. That is to say, comparing the averages of the CS voltage waveform between the A and B period, it can be seen that the A period has a smaller value than the B period.

By defining the CS voltage waveform as described above, the voltages applied to subpixels shown in FIGS. 6A and 6B come to have the following four types: Type AP to be applied to a subpixel during an A period of the CS voltage waveform in a situation where the subpixel is supplied with a positive display signal voltage; Type AN to be applied to a subpixel during an A period of the CS voltage waveform in a situation where the subpixel is supplied with a negative display signal voltage; Type BP to be applied to a subpixel during a B period of the CS voltage waveform in a situation where the subpixel is supplied with a positive display signal voltage; and Type BN to be applied to a subpixel during a B period of the CS voltage waveform in a situation where the subpixel is supplied with a negative display signal voltage.

According to the subpixel applied voltage waveforms shown in FIGS. 6A and 6B, these four types of subpixel applied voltages are different from each other.

Specifically, in the subpixel with a relatively high subpixel applied voltage as shown in FIG. 6A, Types AP and BN of subpixel applied voltages are greater than Types BP and AN of subpixel applied voltages. On the other hand, in the subpixel with a relatively low subpixel applied voltage as shown in FIG. 6B, Types AP and BN of subpixel applied voltages are smaller than Types BP and AN of subpixel applied voltages.

The greater the subpixel applied voltage, the higher the display luminance. That is why supposing bright and dark subpixels are identified by SP1 and SP2, respectively, if the CS voltage waveform is varied between A and B periods as described above, then the inequalities Y_SP1_A>Y_SP1_B and Y_SP2_A<Y_SP2_B are satisfied for a pixel on the first row and the display luminance of each subpixel is temporally split into two. Also, just like a pixel of Conventional LCD 2, each pixel of this Inventive LCD 1 is also spatially split into two subpixels SP1 and SP2 and do satisfy the inequalities Y_SP1_A>Y_SP2_A and Y_SP1_B>Y_SP2_B. Consequently, the display luminance of each pixel of this Inventive LCD 1 is split into four (=2×2).

Figure 7:
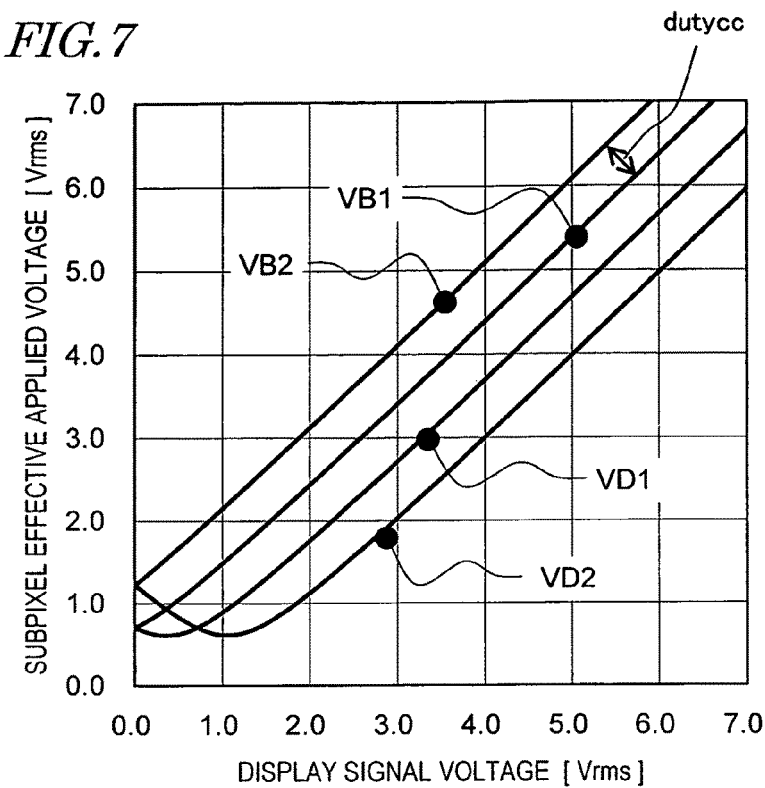
FIG. 7 is a graph showing how the effective voltages applied to subpixels change with the display signal voltage (i.e., signal line voltage) in Inventive LCD 1 shown in FIGS. 6A and 6B.

FIG. 7 shows how the effective voltages applied to subpixels change with the display signal voltage (i.e., signal line voltage) in Inventive LCD 1 shown in FIGS. 6A and 6B. Two curves VB1 and VB2 associated with the bright subpixel shown in FIG. 6A and two more curves VD1 and VD2 associated with the dark subpixel shown in FIG. 6B are shown in FIG. 7. As can be seen, even though the same display signal voltage is supplied to these two subpixels (or the subpixel electrodes thereof), four mutually different effective voltages VB1, VB2, VD1 and VD2 can be applied in a range where the effective voltages applied to the subpixels are equal to or greater than the threshold voltage of the liquid crystal layer. These four effective applied voltages can be obtained by modifying the CS voltage waveform. In FIG. 7, the voltage dependence of the electrostatic capacitance of the liquid crystal layer is not taken into consideration, either, for the sake of simplicity of description as in FIG. 5.

The effective applied voltages and the CS voltage waveforms shown in FIGS. 6A and 6B satisfy the following relation. Specifically, supposing the average of VB1 and VB2 is identified by VB0 and that of VD1 and VD2 is identified by VD0, the difference between VB0 and VD0 varies according to the amplitude of the CS voltage. That is to say, if the CS voltage has zero amplitude, the voltage difference between VB0 and VD0 is also zero. And as the amplitude increases, the voltage difference between VB0 and VD0 widens.

Meanwhile, the voltage difference between VB1 and VB2 and the voltage difference between VD1 and VD2 depend on the duty ratio of the CS voltage waveform. For example, if the CS voltage waveform has a duty ratio of one to one, the voltage difference becomes equal to zero between VB1 and VB2 and between VD1 and VD2. That is to say, on this condition, the result is the same as in Conventional LCD 2 described above. But as the duty ratio deviates from one to one (i.e., as the difference between the duration with the first voltage level and the duration with the second voltage level widens), the difference between VB1 and VB2 and the difference between VD1 and VD2 also increase.

That is to say, the four effective applied voltages obtained by this preferred embodiment can be defined arbitrarily with those features taken into account.

Optionally, by utilizing the relation described above, the number of different effective applied voltages obtained for a single display signal voltage can be further increased from four.

For example, in Inventive LCD 1 described above, one vertical scanning period (e.g., one frame period in this example) has two periods (i.e., A and B periods) in which the CS voltage waveform has mutually different duty ratios. However, as the number of periods (or subframes) is further increased to three, four and so on, the number of different effective applied voltages can be increased from four to six, eight and so on.

Hereinafter, a difference in the viewing angle dependence of the γ characteristic (grayscale luminance characteristic) between Conventional LCDs 1 and 2 and Inventive LCD 1 will be described with reference to FIGS. 8A, 8B and 8C, each of which shows the γ characteristics of the associated LCD when the image on the LCD was viewed from a frontal direction and when that image was viewed obliquely (e.g., from a viewing angle of 60 degrees on the right-hand side). In this case, "viewed from the frontal direction" means being viewed along a normal to the monitor screen, while viewed obliquely (from a viewing angle of 60 degrees on the right-hand side)" means being viewed from a direction defined by an azimuthal direction, which is a horizontal polarization direction (i.e., having an azimuth angle of zero degrees) of one of the two polarization axes (or transmission axes) of a pair of polarizers arranged as crossed Nicols and defined by a polar angle of 60 degrees with respect to the normal to the monitor screen. In this example, these LCDs are arranged so as to have a γ characteristic of 2.2 when viewed from the frontal direction.

Figure 8A:
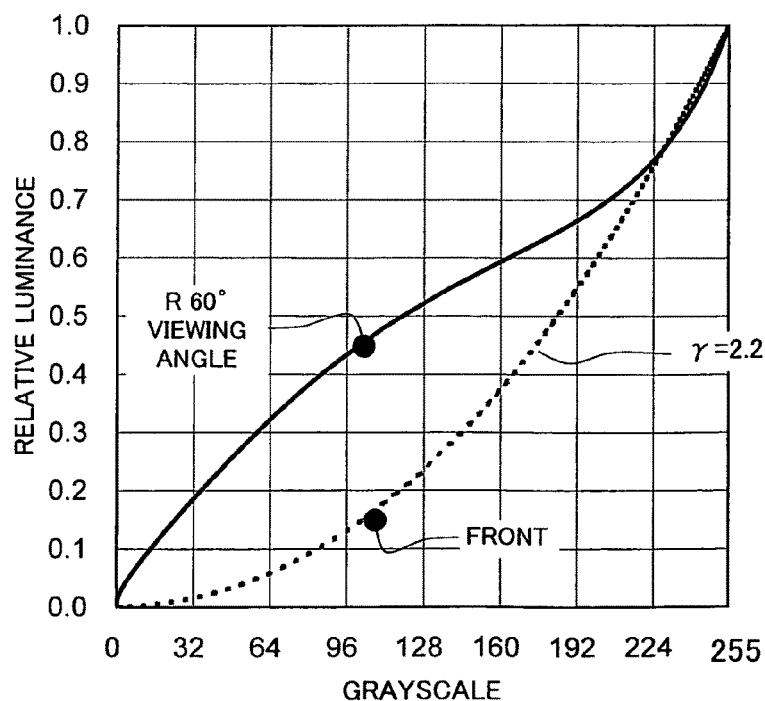
FIG. 8A is a graph showing the viewing angle dependence of the γ characteristic of Conventional LCD 1.
Figure 8B:
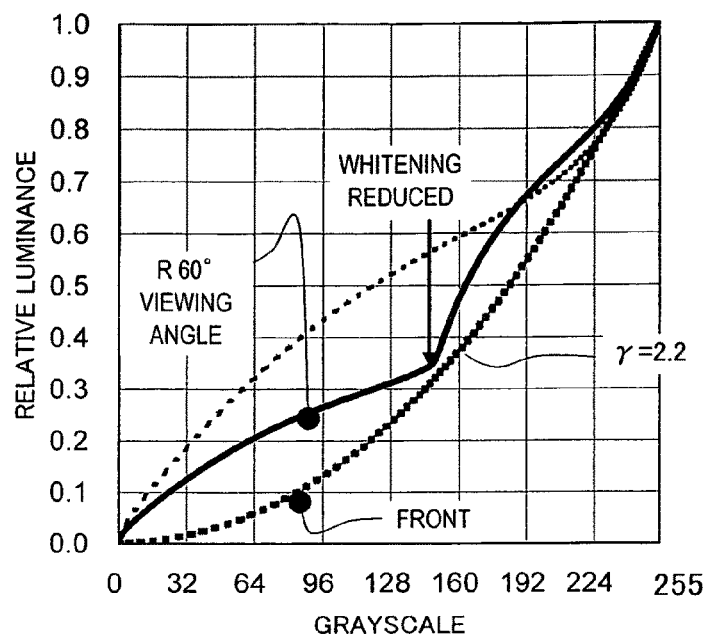
FIG. 8B is a graph showing the viewing angle dependence of the γ characteristic of Conventional LCD 2.

As can be seen from FIG. 8A, in Conventional LCD 1, when the image was viewed obliquely, the γ characteristic is represented by a curve that is significantly raised upward and that deviates most from the γ characteristic associated with the frontal viewing angle around the 128$^{th}$ grayscale.

As can be seen from FIG. 8, Conventional LCD 2 overcomes such a problem, and the γ characteristic associated with the oblique viewing angle tends to be rather close to the γ characteristic associated with the frontal viewing angle around the 160$^{th}$ grayscale. That is to say, the viewing angle dependence of the γ characteristic is reduced significantly mainly in that grayscale range. This is because at grayscale levels lower than the 160$^{th}$ grayscale, mostly the brighter one of the two subpixels of each pixel contributes to the display operation while the dark subpixel has black display state but because at grayscale levels that are equal to or higher than the 160$^{th}$ grayscale, the dark subpixel has an increasing luminance and contributes to the display operation more and more significantly. In other words, in Conventional LCD 2, each pixel is split into two subpixels, and therefore, there are two threshold grayscale levels, at which the luminance start to increase from the black display state. One of the two grayscale levels is black (i.e., the 0$^{th}$ grayscale, or the grayscale level at which the luminance of the bright subpixel starts to increase), while the other grayscale level is a half tone (e.g., around the 160$^{th}$ grayscale, or the grayscale level at which the luminance of the dark subpixel starts to increase). And around that 160$^{th}$ grayscale, the viewing angle dependence of the γ characteristic can be reduced significantly.

Figure 8C:
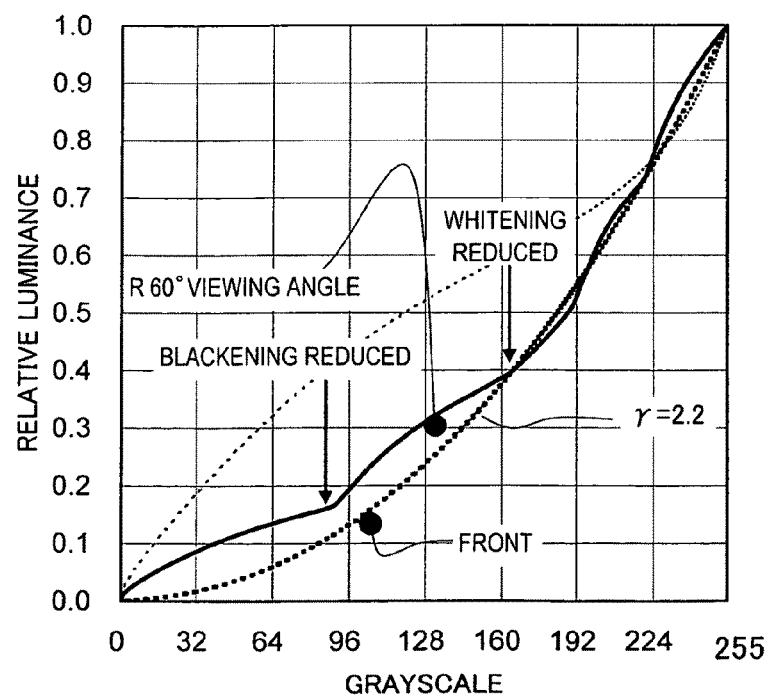
FIG. 8C is a graph showing the viewing angle dependence of the γ characteristic of Inventive LCD 1.

As can be seen from FIG. 8C, Inventive LCD 1 can further reduce the viewing angle dependence of the γ characteristic compared to Conventional LCD 2. As described above, Conventional LCD 2 can significantly reduce the viewing angle dependence of the γ characteristic mostly around the 160$^{th}$ grayscale. On the other hand, Inventive LCD 1 can reduce the viewing angle dependence no less significantly not just around the 160$^{th}$ grayscale but also around the 96$^{th}$ and 224$^{th}$ grayscales as well.

In Inventive LCD 1, each pixel is substantially divided into four subpixels and the number of threshold grayscale levels increases to four. That is why the number of grayscale ranges in which the viewing angle dependence of the γ characteristic can be reduced significantly increases to three, which is obtained by subtracting one (corresponding to black level) from four (that is the number of threshold grayscale levels).

In this case, attention should be paid to the fact that the viewing angle dependence of the γ characteristic can be reduced by Inventive LCD 1 even in a low-grayscale range (i.e., at the 96$^{th}$ grayscale). This is a significant effect because to reduce a variation in colors from an oblique viewing angle in a situation where mixed colors in a half tone range are displayed on an LCD, it is important to reduce the viewing angle dependence in such a low-grayscale range.

And Inventive LCD 1 also contributes greatly to reducing the viewing angle dependence of the γ characteristic in the low-grayscale range to get that important task done. On top of that, Inventive LCD 1 can also shift the grayscale range in which the viewing angle dependence of the γ characteristic is reduced significantly. The grayscale range in which such an improvement can be done depends mainly on the area of a subpixel in the multi-pixel drive mode. Among other things, the most important low-grayscale range shifts according to the area ratio of the subpixel that has the highest effective applied voltage. That is to say, if the area ratio is small, the improvement is done in a range with lower grayscale levels. On the other hand, if the area ratio is large, then the improvement is done in a range with higher grayscale levels. Inventive LCD 1 can change the areas of a subpixel time sequentially. That is to say, the four terms of Equation (2) mentioned above apparently correspond to the respective areas of four subpixels. And by changing the proportions of respective subframes, the area ratios of a subpixel can be changed.

Embodiment 2

Figure 9B:
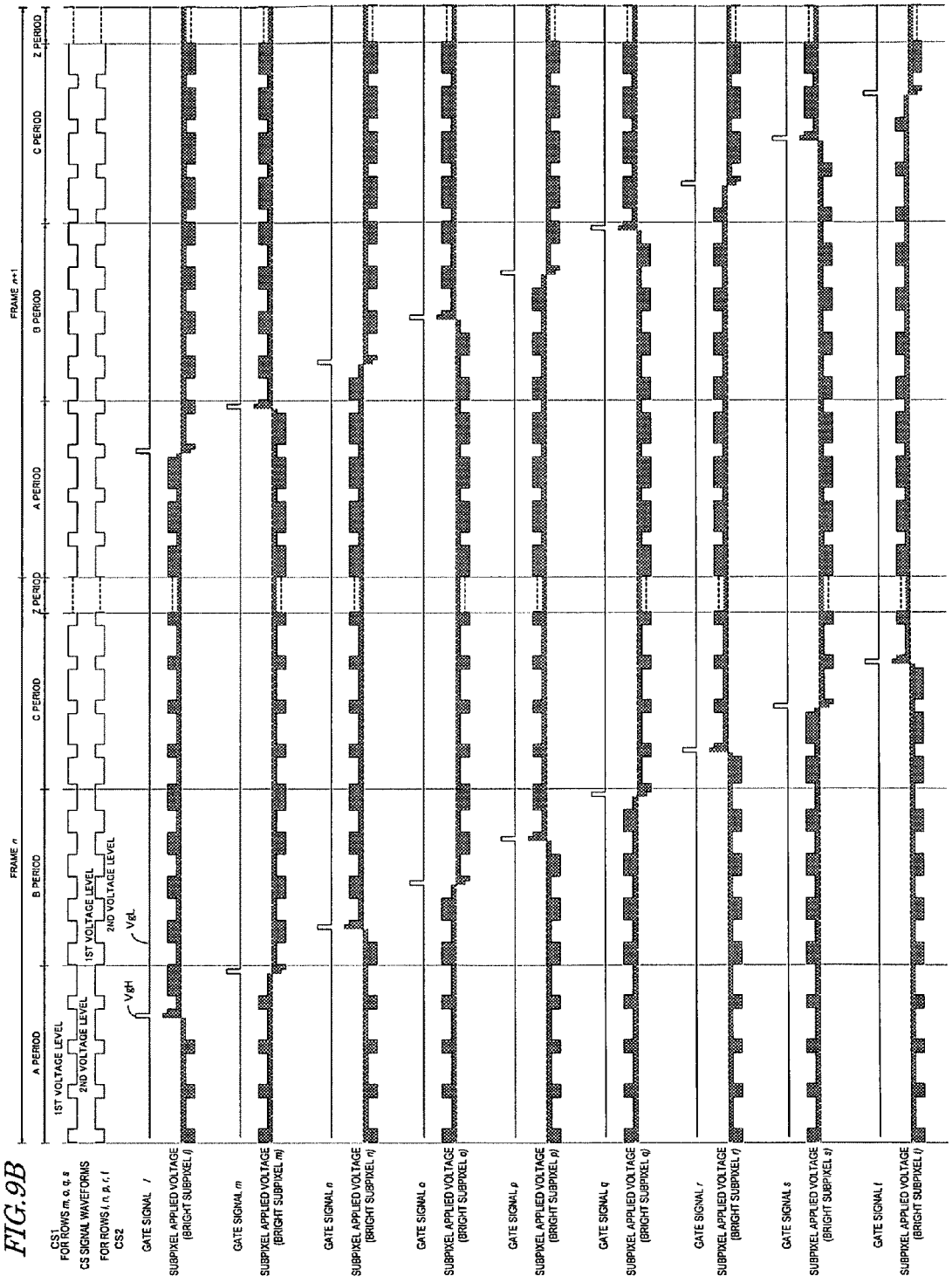
FIG. 9B illustrates the waveforms of CS voltages applied to Inventive LCD 2 and the effective voltages applied to subpixels when the subpixels are dark subpixels.
Figure 9C:
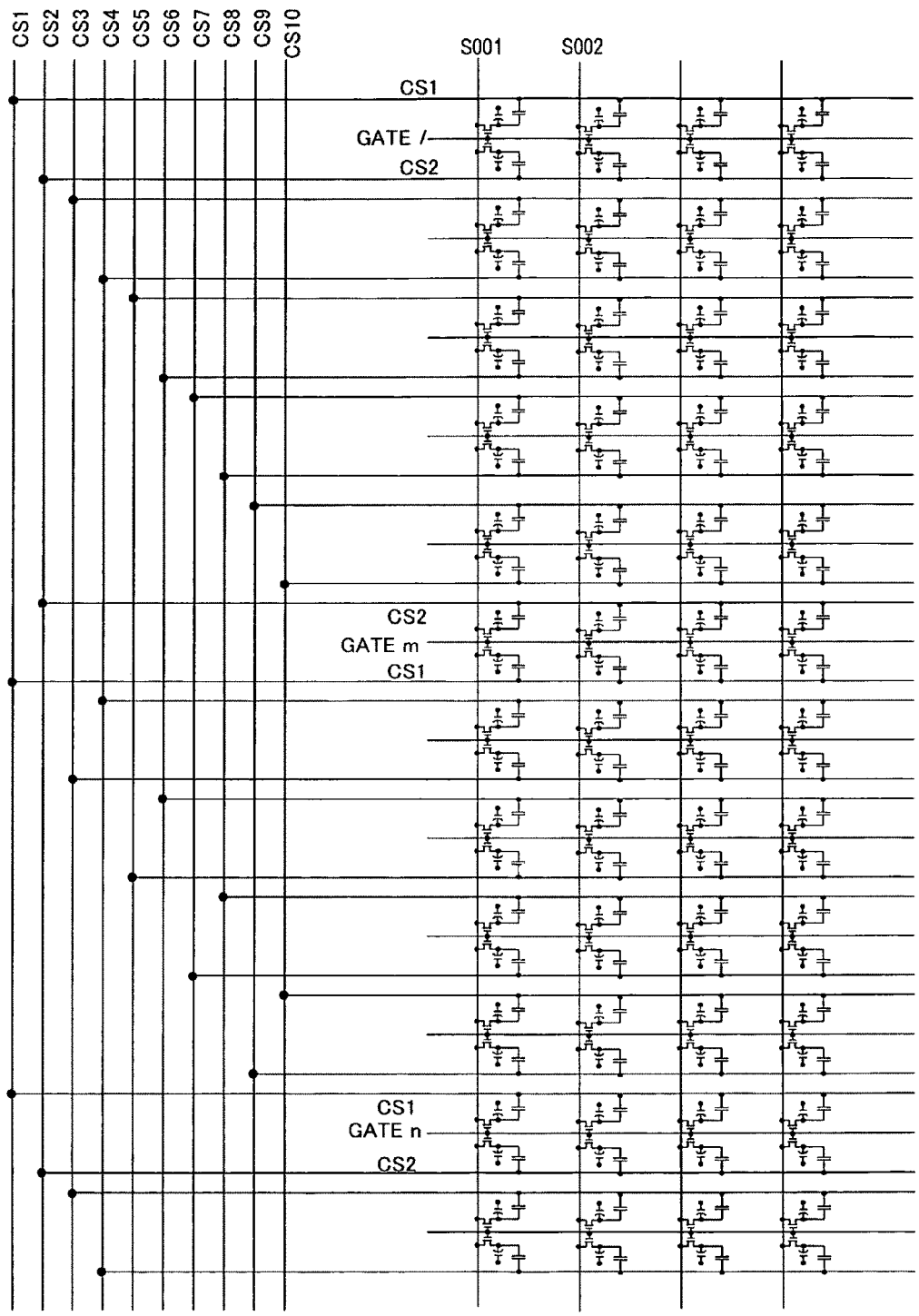
FIG. 9C illustrates how CS bus lines are connected to the respective storage capacitors of subpixels in Inventive LCD 2.

FIGS. 9A and 9B illustrate the waveforms of CS voltages applied to multi-pixel driven Inventive LCD 2 as a second preferred embodiment of the present invention and the effective voltages applied to subpixels. FIG. 9A illustrates waveforms for the bright subpixel, while FIG. 9B illustrates waveforms for the dark subpixel. And FIG. 9C illustrates how CS bus lines are connected to the respective storage capacitors of subpixels. In FIGS. 9A to 9C, the gate bus lines (corresponding to rows of pixels) are identified by l, m, o, q, r, s and t, which are integers that are equal to or greater than one and that represent the respective numbers of the gate bus lines. Naturally, these signs are totally different from the signs (including m and n) representing the division numbers as in FIGS. 4A to 4C.

In Inventive LCD 1 of the first preferred embodiment described above, in any of the bright and dark subpixels, both subpixels with positive and negative write polarities are controlled using a single CS voltage waveform. That is why only one CS voltage waveform is shown in each of FIGS. 6A and 6B.

On the other hand, in Inventive LCD 2 of this preferred embodiment, in either the bright subpixel or the dark subpixel, two dedicated CS voltage waveforms are used for the positive and negative write polarities, respectively.

In Inventive LCD 1, in order to modulate the luminance of a subpixel in less than one vertical scanning period, the duty ratios of the CS voltage waveform are changed. This is also done in this preferred embodiment.

In each of FIGS. 9A and 9B, illustrated are two types of CS voltage waveforms. Inventive LCD 2 controls a subpixel with positive write polarity (or charge polarity) and a subpixel with negative write polarity using two different CS voltage waveforms within an arbitrary vertical scanning period. In Inventive LCD 2, each CS voltage waveform consists of four periods, namely, A period, B period, C period and Z period. Among these four periods, the Z period plays the same role as the counterpart of Inventive LCD 1. Meanwhile, the A, B and C periods are provided in order to change the luminances (i.e., to modulate the luminance) of a subpixel in less than one scanning period.

In Inventive LCD 1, the luminance is supposed to be modulated in two periods (i.e., A and B periods) of the CS voltage waveform. On the other hand, in this Inventive LCD 2, the luminance is modulated in three periods (i.e., A, B and C periods). However, the luminance does not always have to be modulated in two or three periods but may also be modulated in four, five or an even greater number of periods.

According to each of the CS voltage waveforms shown in FIGS. 9A and 9B, the duty ratios of the rectangular wave are changed in the A, B and C periods. Specifically, in the example illustrated in FIGS. 9A and 9B, according to the CS voltage waveform CS1 for the bright subpixel shown in FIG. 9A, the proportion of a first voltage level interval to one cycle is 30% in A period, 50% in B period, and 70% in C period, respectively. On the other hand, according to the CS voltage waveform CS2, the proportion of a first voltage level interval to one cycle is 70% in A period, 50% in B period, and 30% in C period, respectively.

In FIGS. 9A and 9B, the voltages applied to the subpixel electrodes in the respective periods have the following waveforms.

Look at the $n^{th}$ frame, and it can be seen that in the bright subpixel (on the $l^{th}$ row shown in FIG. 9A), the magnitudes of the effective voltages applied to the subpixel in the A, B and C periods increase in this order and the luminance increases in this order, too. On the other hand, in the dark subpixel (shown in FIG. 9B), the magnitudes of the effective voltages applied to the subpixel in the A, B and C periods decrease in this order and the luminance decreases in this order, too. That is why the difference in luminance between the bright and dark subpixels decreases in the order of C, B and A periods.

In the example illustrated in FIGS. 9A and 9B, the ranking of the luminances in the respective periods and the order of the magnitudes of differences in luminance between the subpixels reverse on a frame by frame basis. Specifically, look at the $(n+1)^{th}$ frame, and it can be seen that in the bright subpixel (on the $l^{th}$ row shown in FIG. 9A), the magnitudes of the effective voltages applied to the subpixel increase in the order of C, B and A periods and the luminance increases in this order, too. On the other hand, in the dark subpixel (shown in FIG. 9B), the magnitudes of the effective voltages applied to the subpixel decrease in the order of C, B and A periods and the luminance decreases in this order, too. That is to say, as in Inventive LCD 1 of the first preferred embodiment described above, by modulating the CS voltage waveform, the luminance of the subpixel can be modulated within one vertical scanning period (i.e., varied time sequentially).

Figure 10:
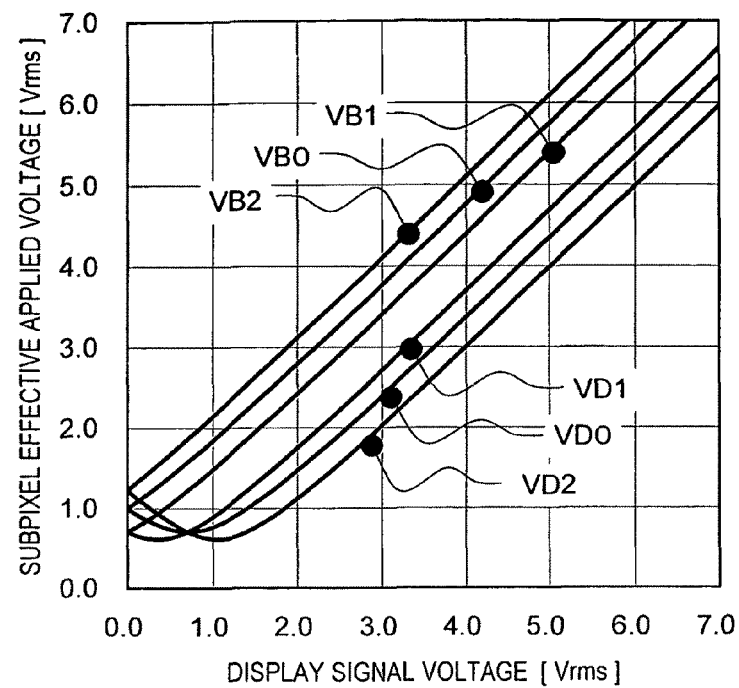
FIG. 10 is a graph showing how the effective voltages applied to subpixels change with the display signal voltage (i.e., signal line voltage) in Inventive LCD 2 shown in FIGS. 9A and 9B.

FIG. 10 shows how the effective voltages applied to subpixels change with the display signal voltage (i.e., signal line voltage) in Inventive LCD 2 shown in FIGS. 9A and 9B. Three curves VB0, VB1 and VB2 associated with the bright subpixel shown in FIG. 9A and three more curves VD0, VD1 and VD2 associated with the dark subpixel shown in FIG. 9B are shown in FIG. 10. As can be seen, even though the same display signal voltage is supplied to these two subpixels (or the subpixel electrodes thereof), six mutually different effective voltages VB0, VB1, VB2, VD0, VD1 and VD2 can be applied. These six effective applied voltages can be obtained by modifying the CS voltage waveform. In FIG. 10, the voltage dependence of the electrostatic capacitance of the liquid crystal layer is not taken into consideration, either, for the sake of simplicity of description as in FIG. 5.

The six effective applied voltages in Inventive LCD 2 of this preferred embodiment can also be changed by varying the duty ratios of the CS voltage waveforms in respective regions as in the first preferred embodiment described above.

Embodiment 3

Patent Document No. 5 cited above discloses an example in which the number of electrically independent storage capacitor trunks (corresponding to the number of different CS voltages) is defined to be smaller than that of storage capacitor lines (i.e., CS bus lines). According to Patent Document No. 5, if each pixel is evenly split into two, the number of electrically independent storage capacitor trunks is defined to be smaller than twice the number of gate bus lines. However, the present invention is in no way limited to such a specific example. Instead, Inventive LCD 3 as a third preferred embodiment of the present invention adopts a configuration for supplying CS voltages to respective storage capacitor lines independently of each other. This Inventive LCD 3 has the advantage of increasing the number of options as first and second waveforms for the CS voltages. Nevertheless, each CS voltage should change its levels at least once after the gate voltage has gone low within one vertical scanning period. Also, if a liquid crystal display device including storage capacitor lines, of which the number is at least equal to that of gate bus lines, and a configuration for supplying CS voltages to those storage capacitor lines independently of each other should change the CS voltage levels after the gate voltage has gone low, either the interval between a point in time when the gate voltage has gone low and a point in time when the CS voltage changes its levels or the interval between a point in time when the CS voltage changes its levels and a point in time when the gate voltage goes high next time within one vertical scanning period is preferably defined to be constant on every display line. Then, the luminance can be uniform on every display line in the liquid crystal display device of the present invention.

Conversely, if a configuration for providing a storage capacitor trunk for multiple storage capacitor lines is adopted, then the CS voltages supplied to those storage capacitor lines that are all connected to a single storage capacitor trunk can have exactly the same amplitude of oscillation. Naturally, the circuit configuration can be simplified compared to a situation where a number of voltages are prepared independently of each other.

If the temporal division of the present invention is introduced, the configuration of Inventive LCD 3 of this preferred embodiment for supplying CS voltages to multiple storage capacitor lines independently of each other is preferably adopted.

Figure 11:
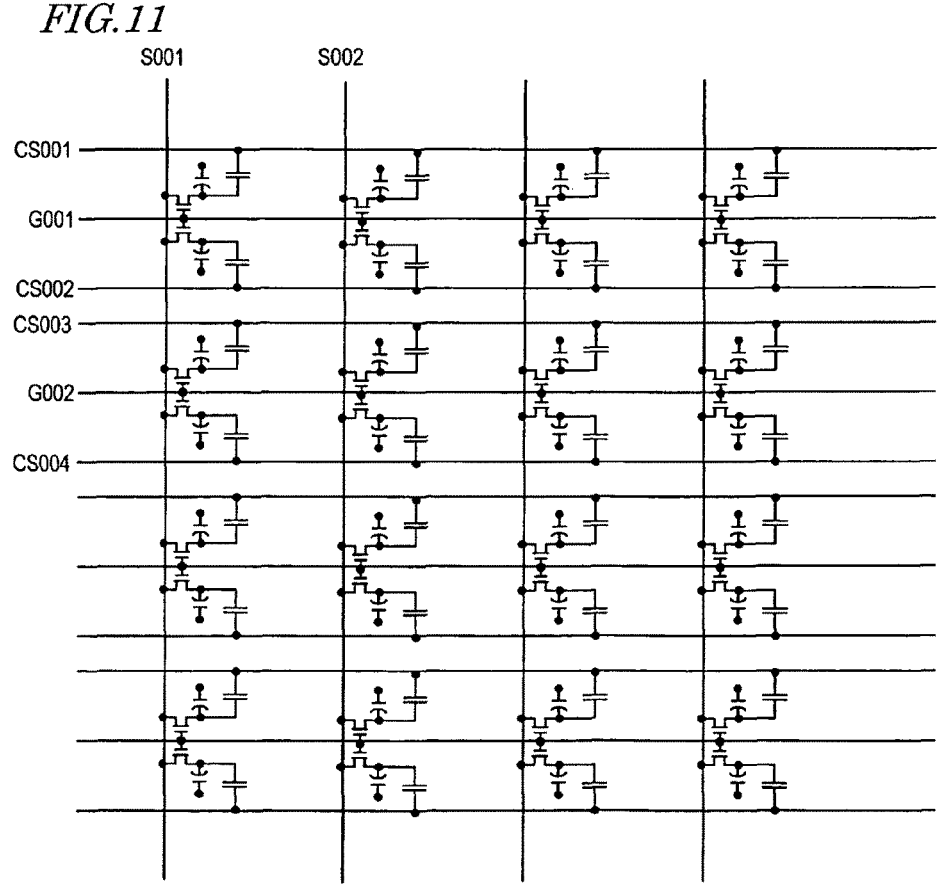
FIG. 11 is an equivalent circuit diagram illustrating how CS bus lines are connected to the respective storage capacitors of subpixels in Inventive LCD 3.

In the first and second preferred embodiments described above, the duty ratios of each CS voltage are changed within one vertical scanning period, thereby varying the luminance of each subpixel. However, the present invention is in no way limited to those specific preferred embodiments. Rather in Inventive LCD 3 of this preferred embodiment, the CS voltages may be changed in any arbitrary manner. Among other things, with the configuration for supplying CS voltages to multiple storage capacitor lines CS001, CS002, CS003 and so on independently of each other by connecting the CS bus lines and subpixel capacitors as shown in FIG. 11, the number of options as CS voltage waveforms can be increased significantly. In a situation where the configuration shown in FIG. 11 is adopted, the CS voltage may have its amplitudes changed one subframe after another so that each subpixel can have multiple different luminance levels within one vertical scanning period as shown in FIG. 12.

Figure 12:
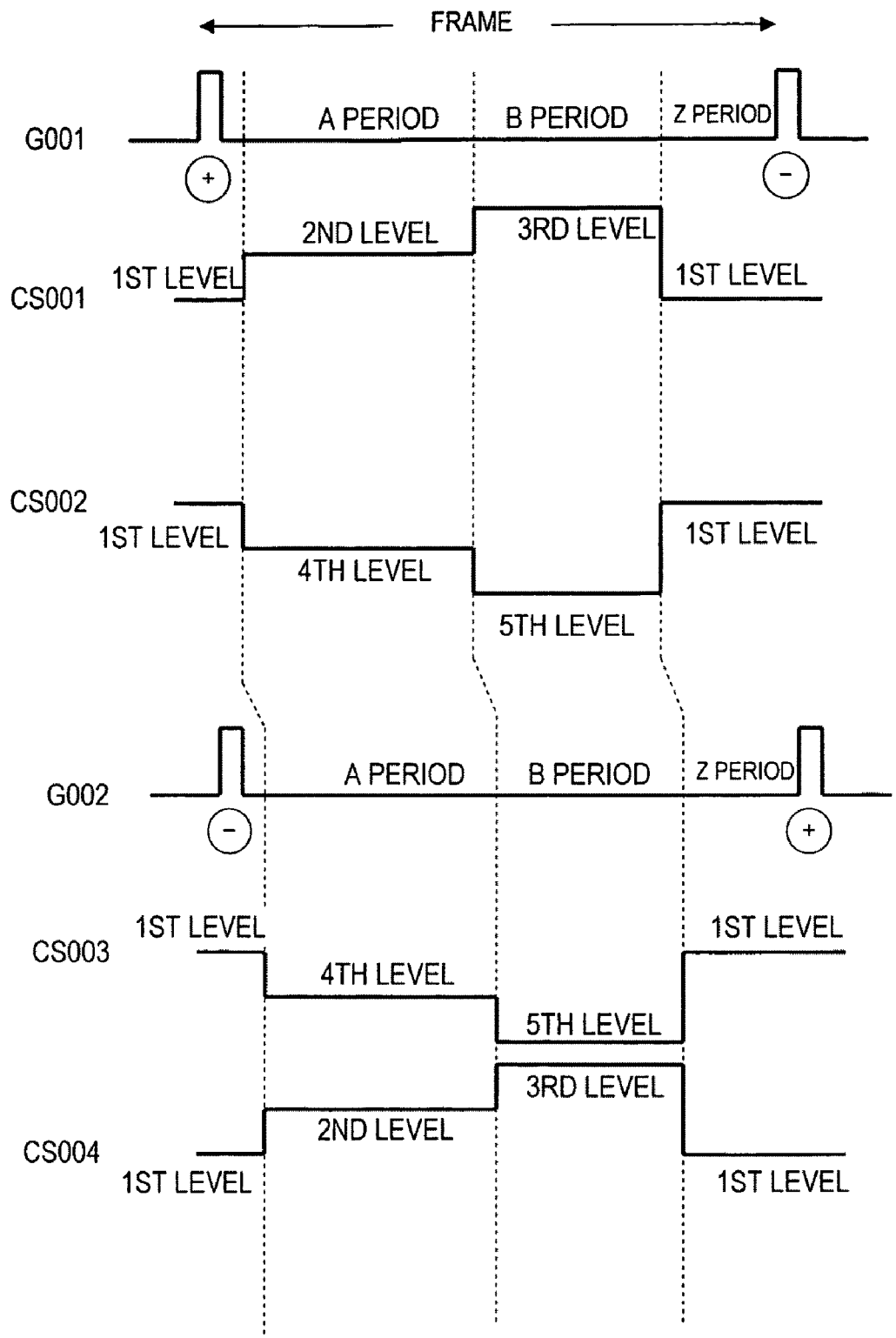
FIG. 12 shows exemplary waveforms for gate voltages and CS voltages for use in Inventive LCD 3 shown in FIG. 11.

FIG. 12 shows exemplary waveforms for gate voltages and CS voltages for use in a liquid crystal display device represented by the equivalent circuit shown in FIG. 11. The sign shown under each gate voltage indicates the write polarity of the display signal voltage, i.e., the polarity of the display signal voltage to be written when the gate voltage goes high, where the polarity is defined with respect to the counter voltage. In the example to be described below, the polarity inverts each row of pixels (which is so-called "1H inversion"). As in the CS voltages of the first preferred embodiment described above, the CS voltage waveform of this example also has A, B and Z periods.

After the gate voltage on a scan line G001 that is connected to the TFTs of pixels on the first row has changed its levels from high into low, the CS voltage on a CS bus line CS001 connected to the storage capacitor counter electrode of one subpixel has its amplitude increased from a first level to a second level (in the A period). Meanwhile, the CS voltage on a CS bus line CS002 connected to the storage capacitor counter electrode of the other subpixel has its amplitude decreased from the first level to a fourth level (in the A period). As a result, in the A period, the one subpixel becomes a bright subpixel, while the other subpixel becomes a dark subpixel.

Next, in the transition between the A and B periods, the CS voltage on CS001 has its amplitude further increased from the second level to a third level. As a result, the luminance of the bright subpixel further increases in the B period. Meanwhile, the CS voltage on CS002 has its amplitude further decreased from the fourth level to a fifth level and the luminance of the dark subpixel further decreases in the B period.

Finally, in the Z period, both of the CS voltages on CS001 and CS002 return to the first level again.

The gate voltage on a scan line G002 connected to the TFTs of pixels on the second row goes high one horizontal scanning period later than the gate voltage on the scan line G001 connected to the TFTs of the pixels on the first row. That is why the CS voltages on CS bus lines CS003 and CS004 change 1H later than the CS voltages on CS001 and CS002.

In this case, the voltages on CS003 and CS004 change (i.e., increase or decrease) in a different direction from their counterparts on CS001 and CS002, because the display signal voltages have mutually opposite write polarities between these two pairs.

Thus, the gate voltage on a scan line G011 connected to the TFTs of pixels on the eleventh row goes high 10H later than the gate voltage on the scan line G001 connected to the TFTs of the pixels on the first row. That is why the CS voltages on CS bus lines CS021 and CS022 change 10H later than the CS voltages on the CS bus lines CS001 and CS002 (not shown).

Figure 13:
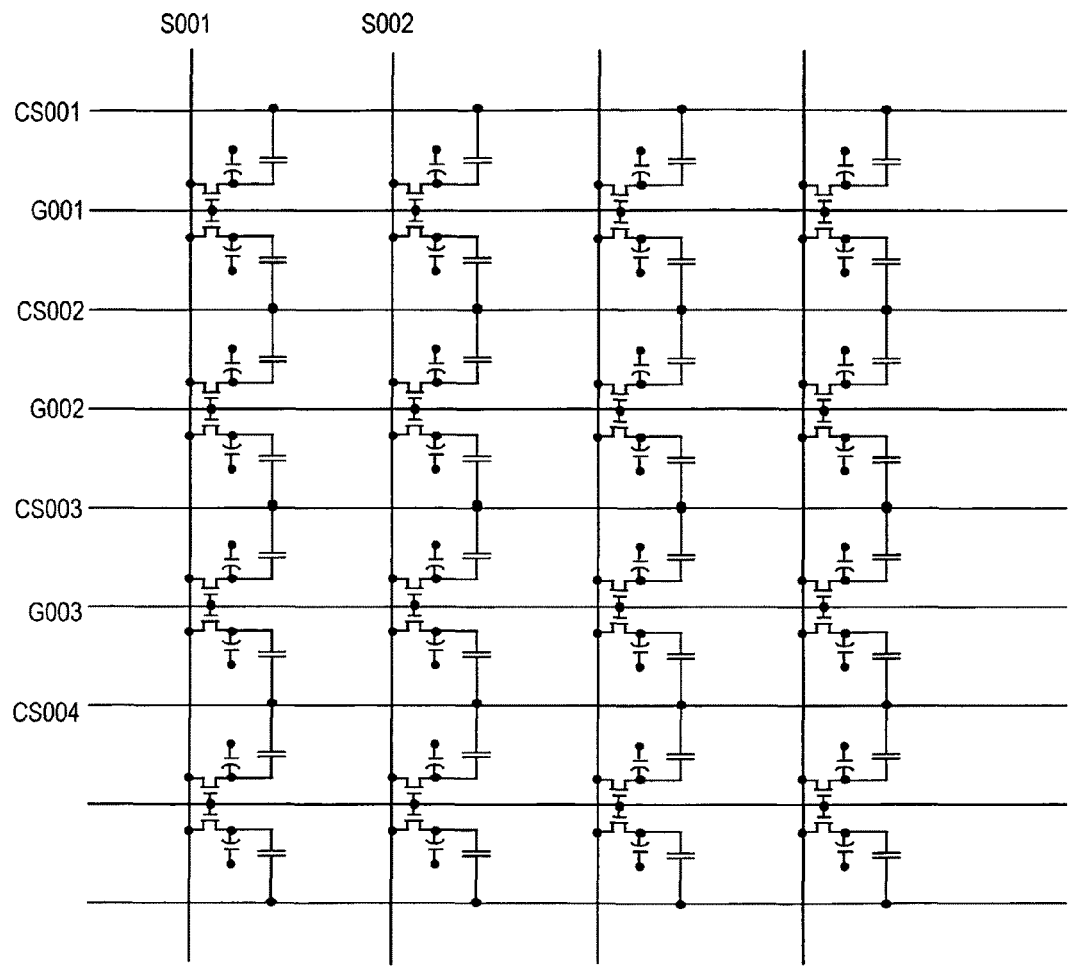
FIG. 13 is an equivalent circuit diagram illustrating how CS bus lines may also be connected to the respective storage capacitors of subpixels in Inventive LCD 3.

FIG. 11 illustrates an example in which CS bus lines are provided for respective subpixels independently of each other. However, the present invention is in no way limited to that specific preferred embodiment. Alternatively, a configuration in which the same CS bus line is connected to the storage capacitors of two subpixels that are adjacent to each other in the column direction as shown in FIG. 13 may also be adopted. By adopting such a configuration, the number of CS bus lines can be naturally reduced. On top of that, the gap between two subpixels that are adjacent to each other in the column direction can be shielded from light with the CS bus line. As a result, there is no need to provide any additional opaque film and the effective aperture ratio of each pixel can be increased.

Figure 14:
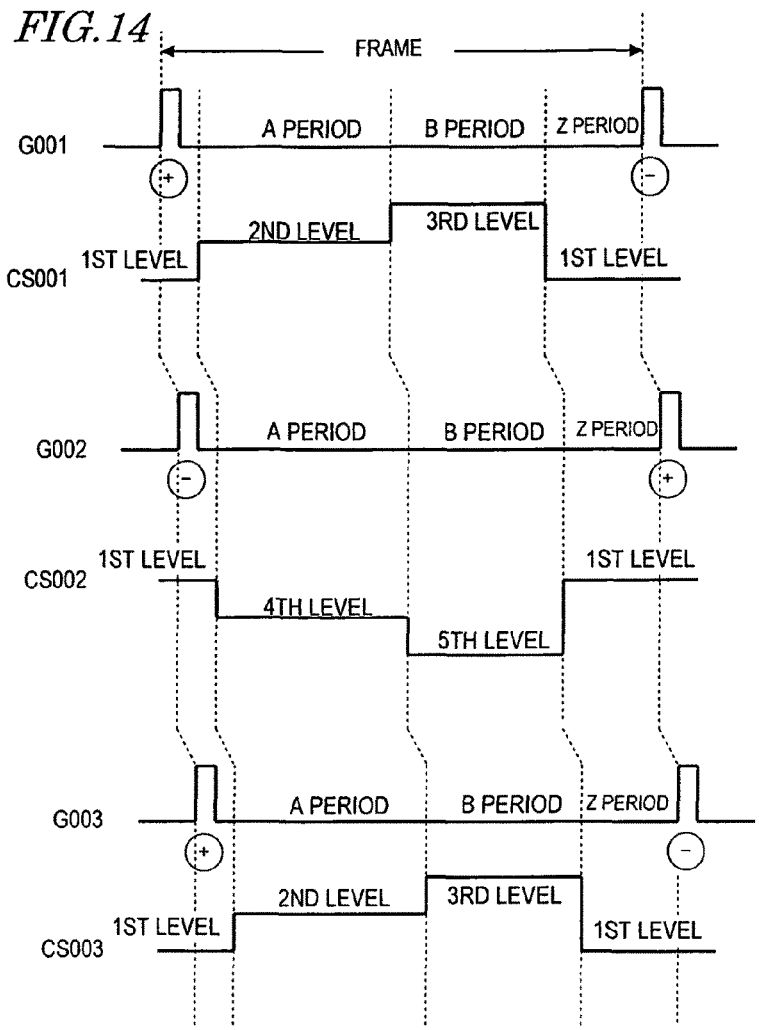
FIG. 14 shows exemplary waveforms for gate voltages and CS voltages for use in Inventive LCD 3 shown in FIG. 13.

FIG. 14 illustrates exemplary waveforms for gate voltages and CS voltages for use in Inventive LCD 3 shown in FIG. 13. In FIG. 14, shown is a combination of a CS voltage and a gate voltage for the storage capacitor of a bright subpixel in each pixel (i.e., the upper subpixel shown in FIG. 13).

As can be seen from FIG. 14, in the bright subpixels of the pixels on the first row, after the gate voltage on the scan line G001 has changed its levels from high into low, the CS voltage on the CS bus line CS001 has its amplitude increased from the first level to the second level (in the A period). Next, in the bright subpixels of the pixels on the second row (G002), after the gate voltage on the scan line G002 has changed its levels from high into low, the CS voltage on the CS bus line CS002 has its amplitude decreased from the first level to the fourth level (in the A period). And in the bright subpixels of the pixels on the third row (G003), after the gate voltage on the scan line G003 has changed its levels from high into low, the CS voltage on the CS bus line CS003 has its amplitude increased from the first level to the second level (in the A period). In this manner, although a positive voltage is written on the first and third rows, a negative voltage is written on the second row. That is why the amplitudes of the CS voltages change in two opposite directions. The time lag between the rise of a gate voltage on one row of pixels to High level and that of a gate voltage on the previous row of pixels (i.e., the previous scan line) to High level is 1H, so is the time lag between the times when a CS voltage changes its levels on one row of pixels and on the previous row of pixels. Although not described for the rest of the rows of pixels, on every row of pixels, the CS voltage can have its amplitudes changed in a predetermined amount of time after the associated gate voltage has changed its levels.

Although it has been described how voltage levels change on bright subpixels, the same can be said about the dark subpixels (i.e., the lower subpixels in the drawings), too. Nevertheless, the interval between the changes of gate and CS voltages on the bright subpixel of a certain pixel is 1H longer or shorter than the one between the changes of gate and CS voltages on the dark subpixel of the same pixel. However, this time lag is the same in every pixel. Thus, comparing bright subpixels or dark subpixels to each other, there is no time lag between themselves.

As described above, the liquid crystal display device of this preferred embodiment has a configuration for supplying CS voltages to respective CS bus lines independently of each other, and therefore, can determine the timings to change the amplitudes of a CS voltage on respective rows of pixels (with respect to respective gate voltages) independently of each other. As a result, as schematically shown in FIG. 15, the average luminance can be uniform over the screen.

Figure 15:
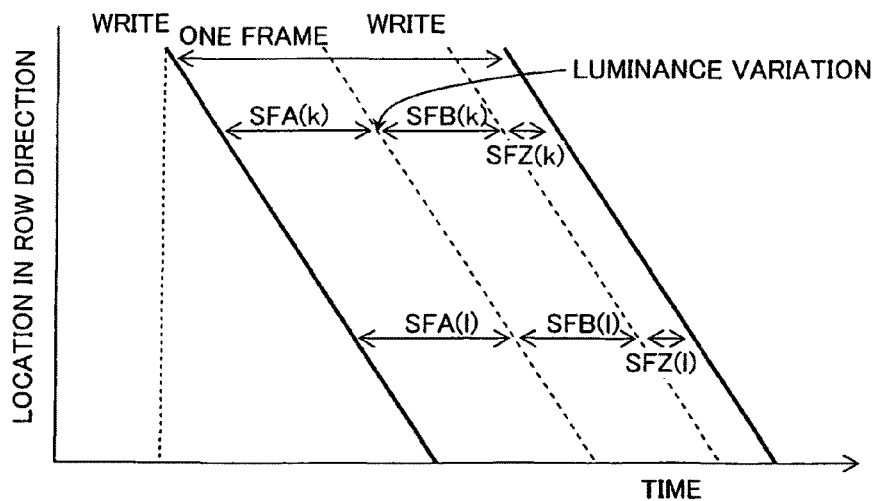
FIG. 15 shows the timings to write display signal voltages on respective pixels by the solid lines and the times when the luminances change on those pixels by the dashed lines in the liquid crystal display device to be driven with the gate voltages and CS voltages shown in FIG. 14.
Figure 16:
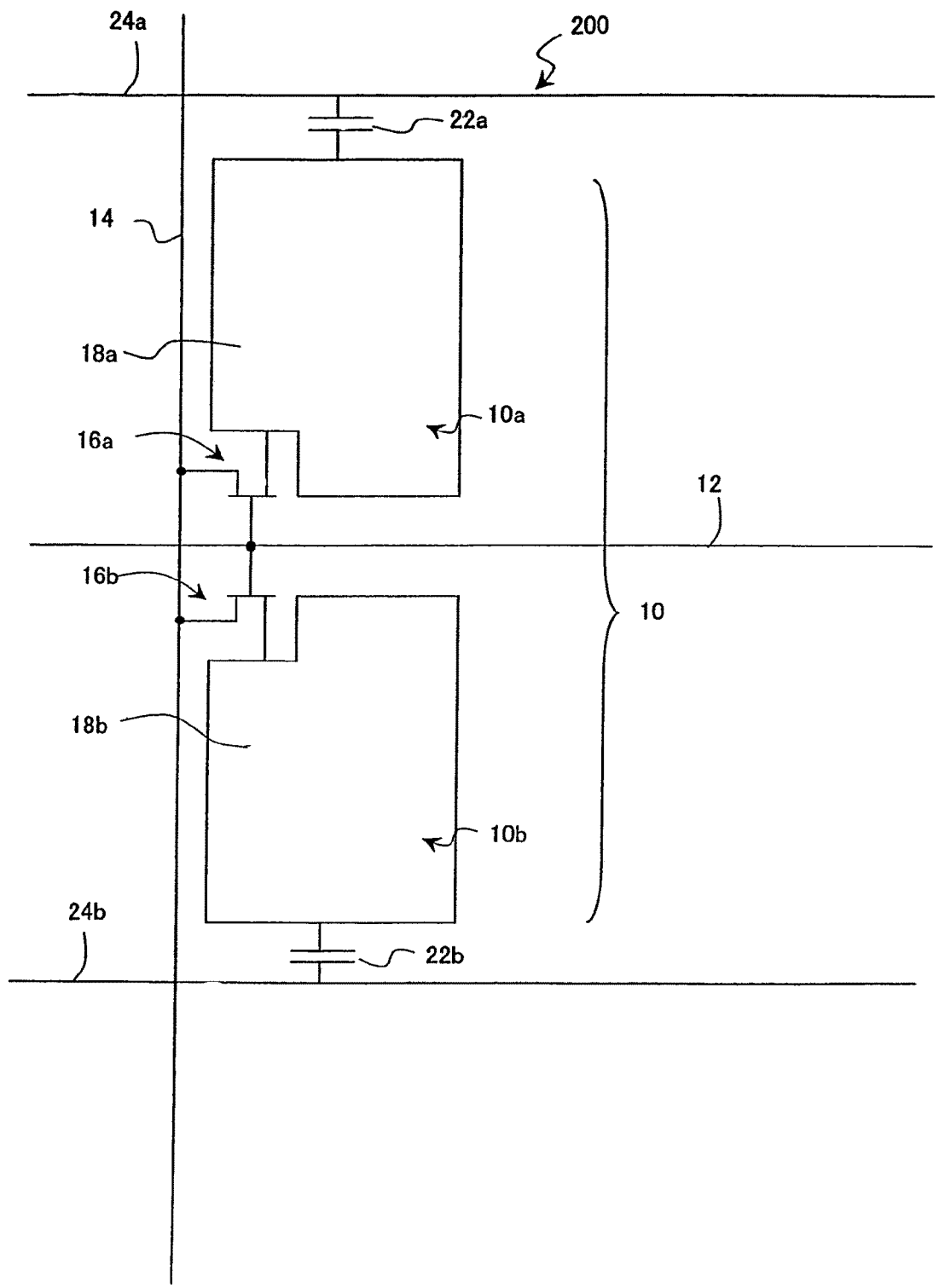
FIG. 16 schematically illustrates the pixel division structure of the liquid crystal display device 200 disclosed in Patent Document No. 5.
Figure 17:
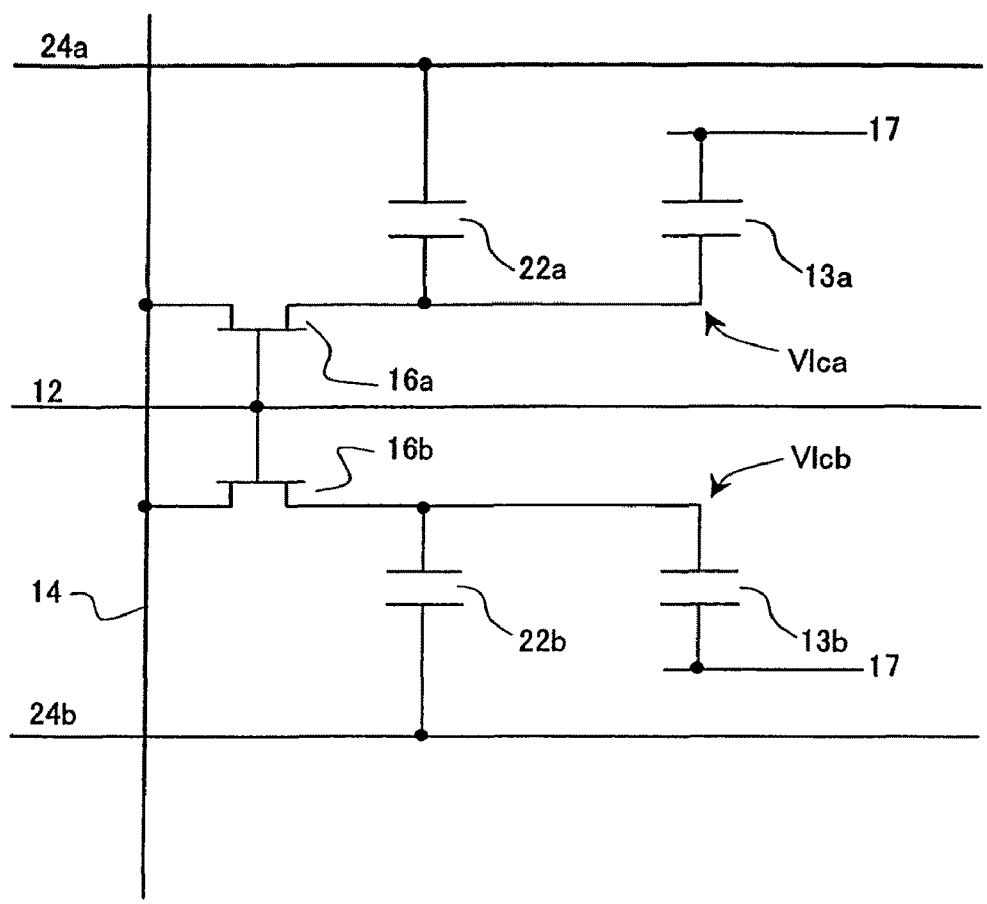
FIG. 17 shows an electrical equivalent circuit corresponding to the pixel structure of the liquid crystal display device 200.

FIG. 15 shows the timings to write display signal voltages on respective pixels by the solid lines and the times when the luminances change on those pixels by the dashed lines. In FIG. 15, the abscissa represents the time and the ordinate represents the on-screen location in the row direction.

From the top toward the bottom of the screen, display signal voltages for respective pixels are sequentially written row by row along the solid line. After that, after a predetermined luminance has been displayed for a certain period of time (i.e., a subframe SFA), the luminances are changed row by row along the dashed line (i.e., a subframe SFB). And then after having gone through an adjustment period (i.e., a subframe SFZ), the processing takes on the next frame. There is a time lag between a point in time when a pixel on a certain row (e.g., a $k^{th}$ row) of the screen is in the subframe SFA(k) and a point in time when a pixel on another row (e.g., an $l^{th}$ row) is in the subframe SFA(l). Likewise, there is also a time lag between a point in time when a pixel on the $k^{th}$ row is in the subframe SFB(k) and a point in time when a pixel on the $l^{th}$ row is in the subframe SFB(l). And there is also a time lag between a point in time when a pixel on the $k^{th}$ row is in the subframe SFZ(k) and a point in time when a pixel on the $l^{th}$ row is in the subframe SFZ(l). However, that time lag agrees with a time lag for writing the display signal voltage row by row. That is why the solid line and the dashed line are parallel to each other in FIG. 15. As a result, the durations of the subframes A, B and Z on one row of pixels agree with those of the subframes A, B and Z on any other row of pixels. Consequently, the average luminance can be uniform over the entire screen.

If a CS trunk that is connected in common to multiple CS bus lines belonging to mutually different rows of pixels were used as described in Patent Document No. 5, the amplitudes of a CS signal would be changed at the same time (i.e., the seam between the A and B periods) on those multiple rows of pixels. As a result, the duration of the subframe A, B or Z would change from one row of pixels to another. This is not beneficial because unevenness in luminance would be sensible on the screen in that case. For that reason, it is preferred that such a configuration for supplying CS voltages to CS bus lines independently of each other be adopted.

Furthermore, if CS voltages are supplied to respective CS bus lines independently of each other, then the luminances of subpixels and subframes can be defined arbitrarily. This is advantageous even in a situation where a driving method in which the luminance rankings of subpixels are changed (i.e., the bright and dark subpixels are interchanged) on a frame-by-frame basis as shown in FIG. 3. On top of that, the bright and dark subpixels can also be interchanged easily while the luminances of the bright and dark subpixels are modulated during each frame period.

INDUSTRIAL APPLICABILITY

The present invention provides a big-screen or high-definition liquid crystal display device that achieves excellent display quality with the viewing angle dependence of the γ characteristic reduced significantly. The liquid crystal display device of the present invention can be used effectively for a TV receiver with a big monitor screen of 30 inches or more.

The invention claimed is:

1. A liquid crystal display device comprising a plurality of pixels that are arranged in columns and rows so as to form a matrix pattern, each said pixel including a liquid crystal layer and a plurality of electrodes for applying a voltage across the liquid crystal layer,
    wherein each said pixel includes a first subpixel SP1 and a second subpixel SP2, having liquid crystal layers to which mutually different voltages are applicable in displaying a certain grayscale, and
    wherein each of the first and second subpixels SP1 and SP2 includes
    a liquid crystal capacitor formed by a counter electrode and a subpixel electrode that faces the counter electrode through the liquid crystal layer, and
    a storage capacitor formed by a storage capacitor electrode that is electrically connected to the subpixel electrode, an insulating layer, and a storage capacitor counter electrode that is opposed to the storage capacitor electrode with the insulating layer interposed between them, and
    wherein the counter electrode is a single electrode provided in common for the first and second subpixels SP1 and SP2, while the storage capacitor counter electrodes of the first and second subpixels SP1 and SP2 are electrically independent of each other, and
    wherein every vertical scanning period V-Total of an input video signal, a common display signal voltage is applied to the respective subpixel electrodes of the first and second subpixels SP1 and SP2, and storage capacitor counter voltages applied independently to the storage capacitor counter electrodes of the first and second subpixels SP1 and SP2 are varied within each said vertical scanning period of the input video signal,
    whereby each said vertical scanning period V-Total of the input video signal includes a first subframe SFA in which the first and second subpixels SP1 and SP2 have luminances Y_SP1_A and Y_SP2_A, respectively, and a second subframe SFB in which the first and second subpixels SP1 and SP2 have luminances Y_SP1_B and Y_SP2_B, respectively, where Y_SP1_A≠Y_SP2_A, Y_SP1_B≠Y_SP2_B, and Y_SP1_A≠Y_SP1_B or Y_SP2_A≠Y_SP2_B are satisfied,
    wherein the storage capacitor counter voltages are oscillating voltages, and
    wherein the storage capacitor counter voltages applied to the storage capacitor counter electrode of the first subpixel in the first and second subframes SFA and SFB of a vertical scanning period V-Total of the input video signal have mutually different amplitudes.

2. The liquid crystal display device of claim 1, further comprising a plurality of storage capacitor lines, each of which is connected to the storage capacitor counter electrodes of the first and second subpixels SP1 and SP2 of an associated one of the pixels, the storage capacitor lines being electrically independent of each other.

3. The liquid crystal display device of claim 2, wherein the storage capacitor counter voltages are oscillating voltages, and
    wherein in a vertical scanning period V-Total of the input video signal, the storage capacitor counter voltages applied to the respective storage capacitor counter electrodes of the first and second subpixels SP1 and SP2 have phases that are different from each other by 180 degrees.

4. The liquid crystal display device of claim 1, further comprising:
    a plurality of storage capacitor lines, each of which is connected to the storage capacitor counter electrodes of the first and second subpixels SP1 and SP2 of an associated one of the pixels, and
    a number of storage capacitor trunks that are electrically independent of each other,
    wherein each of the storage capacitor lines is connected to an associated one of the storage capacitor trunks.

5. The liquid crystal display device of claim 4, wherein the storage capacitor counter voltages are oscillating voltages, and
    wherein in a vertical scanning period V-Total of the input video signal, the storage capacitor counter voltages applied to the respective storage capacitor counter electrodes of the first and second subpixels SP1 and SP2 have phases that are different from each other by 180 degrees.

6. The liquid crystal display device of claim 1, wherein the storage capacitor counter voltages are oscillating voltages, and
    wherein in a vertical scanning period V-Total of the input video signal, the storage capacitor counter voltages applied to the respective storage capacitor counter electrodes of the first and second subpixels SP1 and SP2 have phases that are different from each other by 180 degrees.

* * * * *